United States Patent
Shibukawa et al.

(10) Patent No.: US 12,045,604 B2
(45) Date of Patent: Jul. 23, 2024

(54) ELECTRONIC APPARATUS, INFORMATION PROCESSING SYSTEM, AND INFORMATION PROCESSING METHOD

(71) Applicant: Ricoh Company, Ltd., Tokyo (JP)

(72) Inventors: Tomoki Shibukawa, Tokyo (JP); Genki Watanabe, Tokyo (JP); Ryoh Shimomoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/093,345

(22) Filed: Jan. 5, 2023

(65) Prior Publication Data

US 2023/0153098 A1   May 18, 2023

Related U.S. Application Data

(63) Continuation of application No. 16/896,223, filed on Jun. 9, 2020, now Pat. No. 11,593,087.

(30) Foreign Application Priority Data

Jun. 28, 2019  (JP) ................. 2019-121884

(51) Int. Cl.
*G06F 3/048* (2013.01)
*G06F 3/0482* (2013.01)
(Continued)

(52) U.S. Cl.
CPC .............. *G06F 8/65* (2013.01); *G06F 3/0482* (2013.01); *H04N 1/00411* (2013.01); *H04N 1/00973* (2013.01); *G06F 2203/04803* (2013.01)

(58) Field of Classification Search
CPC ............ G06F 3/0482; G06F 8/61; G06F 8/65; H04N 1/0041
See application file for complete search history.

(56) References Cited

U.S. PATENT DOCUMENTS 8,064,789 B2   11/2011 Moroi
9,164,757 B2   10/2015 Han
(Continued)

FOREIGN PATENT DOCUMENTS

EP        3407179 A1   11/2018
JP     2008-077474 A    4/2008
(Continued)

OTHER PUBLICATIONS

Extended European Search Report issued Nov. 17, 2020 in European Patent Application No. 20178088.9, 9 pages.
(Continued)

*Primary Examiner* — Claudia Dragoescu
(74) *Attorney, Agent, or Firm* — XSENSUS LLP

(57) ABSTRACT

An electronic apparatus installable with firmware updatable via a network includes an input unit configured to receive an operation performed by a user; and circuitry configured to display, on a display, a first screen for displaying a first function of firmware that can be installed on the electronic apparatus, and a second screen for displaying a second function of the firmware, the second function including a plurality of second functions and the second screen including a plurality of second screens prepared for each one of the plurality of second functions, enable the first function in response to an operation for the first function displayed on the first screen, and enable the second function in response to an operation for the second function displayed on the second screen. The circuitry enables the second functions selected from the plurality of second functions respectively displayed on the plurality of second screens.

15 Claims, 17 Drawing Sheets

(51) Int. Cl.
*G06F 8/65* (2018.01)
*H04N 1/00* (2006.01)

(56) References Cited

U.S. PATENT DOCUMENTS

| | | |
|---|---|---|
| 9,547,487 B2 | 1/2017 | Adachi |
| 9,838,250 B1 | 12/2017 | Ali |
| 10,564,957 B2 | 2/2020 | Okamoto et al. |
| 10,809,993 B2 | 10/2020 | Igarashi |
| 2003/0142351 A1 | 7/2003 | Sakura |
| 2007/0113030 A1 | 5/2007 | Bennett et al. |
| 2008/0127159 A1 | 5/2008 | Van Regenmorter |
| 2008/0270685 A1 | 10/2008 | Kato |
| 2009/0034496 A1 | 2/2009 | Ko et al. |
| 2009/0063612 A1 | 3/2009 | Hyo |
| 2011/0161881 A1 | 6/2011 | Tomita et al. |
| 2011/0209134 A1 | 8/2011 | Toda |
| 2013/0117740 A1 | 5/2013 | Oh |
| 2013/0198507 A1 | 8/2013 | Kasuya |
| 2014/0082747 A1 | 3/2014 | Negoro et al. |
| 2014/0115572 A1 | 4/2014 | Michishita |
| 2014/0215450 A1* | 7/2014 | Salisbury ............... G06F 8/65 717/172 |
| 2014/0164106 A1 | 8/2014 | Naik et al. |
| 2014/0226181 A1 | 8/2014 | Shibukawa et al. |
| 2014/0258913 A1 | 9/2014 | Shibukawa et al. |
| 2014/0268225 A1 | 9/2014 | Shibukawa et al. |
| 2014/0325526 A1 | 10/2014 | Nagata et al. |
| 2014/0355049 A1 | 12/2014 | Hadano |
| 2015/0070726 A1 | 3/2015 | Umezawa et al. |
| 2015/0169028 A1 | 6/2015 | Shibukawa |
| 2015/0296470 A1 | 10/2015 | Kim et al. |
| 2015/0331688 A1 | 11/2015 | Shimizu |
| 2015/0346957 A1* | 12/2015 | Louch ................. G06F 3/04842 715/765 |
| 2016/0080592 A1 | 3/2016 | Oshima |
| 2016/0150115 A1 | 5/2016 | Shibukawa et al. |
| 2016/0337544 A1* | 11/2016 | Han ................... H04N 1/00973 |
| 2016/0378305 A1 | 12/2016 | Shibukawa |
| 2017/0039057 A1 | 2/2017 | Stefan |
| 2017/0163826 A1 | 6/2017 | Nakazawa et al. |
| 2017/0223801 A1 | 8/2017 | Gan et al. |
| 2017/0255456 A1 | 9/2017 | Igarashi |
| 2017/0310841 A1 | 10/2017 | Shibukawa et al. |
| 2018/0039461 A1 | 2/2018 | Wakasa |
| 2018/0060064 A1 | 3/2018 | Okamoto et al. |
| 2018/0181388 A1 | 6/2018 | Takahashi |
| 2018/0278756 A1 | 9/2018 | Shibukawa et al. |
| 2019/0035253 A1 | 1/2019 | Jones, II et al. |
| 2019/0104229 A1 | 4/2019 | Asai |
| 2019/0286316 A1 | 9/2019 | Hatanaka et al. |
| 2019/0354359 A1 | 11/2019 | Olderdissen et al. |
| 2020/0073570 A1 | 3/2020 | Shao |
| 2020/0409685 A1 | 12/2020 | Shimomoto et al. |
| 2021/0117178 A1 | 4/2021 | Harada et al. |

FOREIGN PATENT DOCUMENTS

| | | |
|---|---|---|
| JP | 2008-234235 A | 10/2008 |
| JP | 2014-232512 A | 12/2014 |
| JP | 2016-058952 A | 4/2016 |
| JP | 2016-212855 | 12/2016 |
| JP | 2018-097774 A | 6/2018 |

OTHER PUBLICATIONS

Office Action issued Mar. 14, 2023 in Japanese Patent Application No. 2019-121884, 13 pages.

Japanese Office Action issued Aug. 15, 2023, in corresponding Japanese Application No. 2019-121884, 11pp.

* cited by examiner

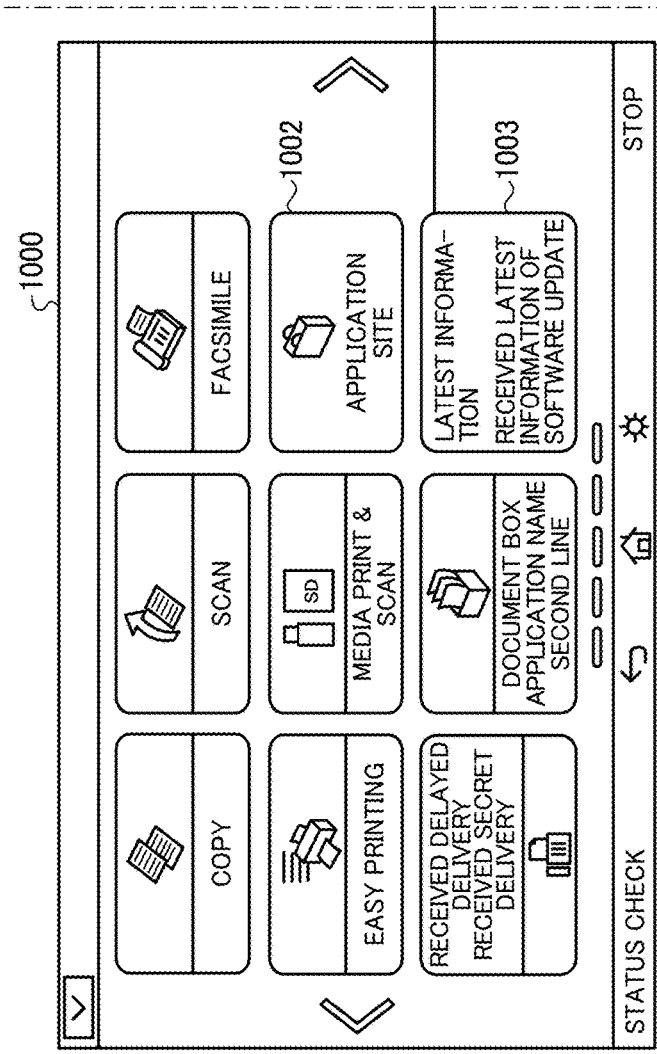

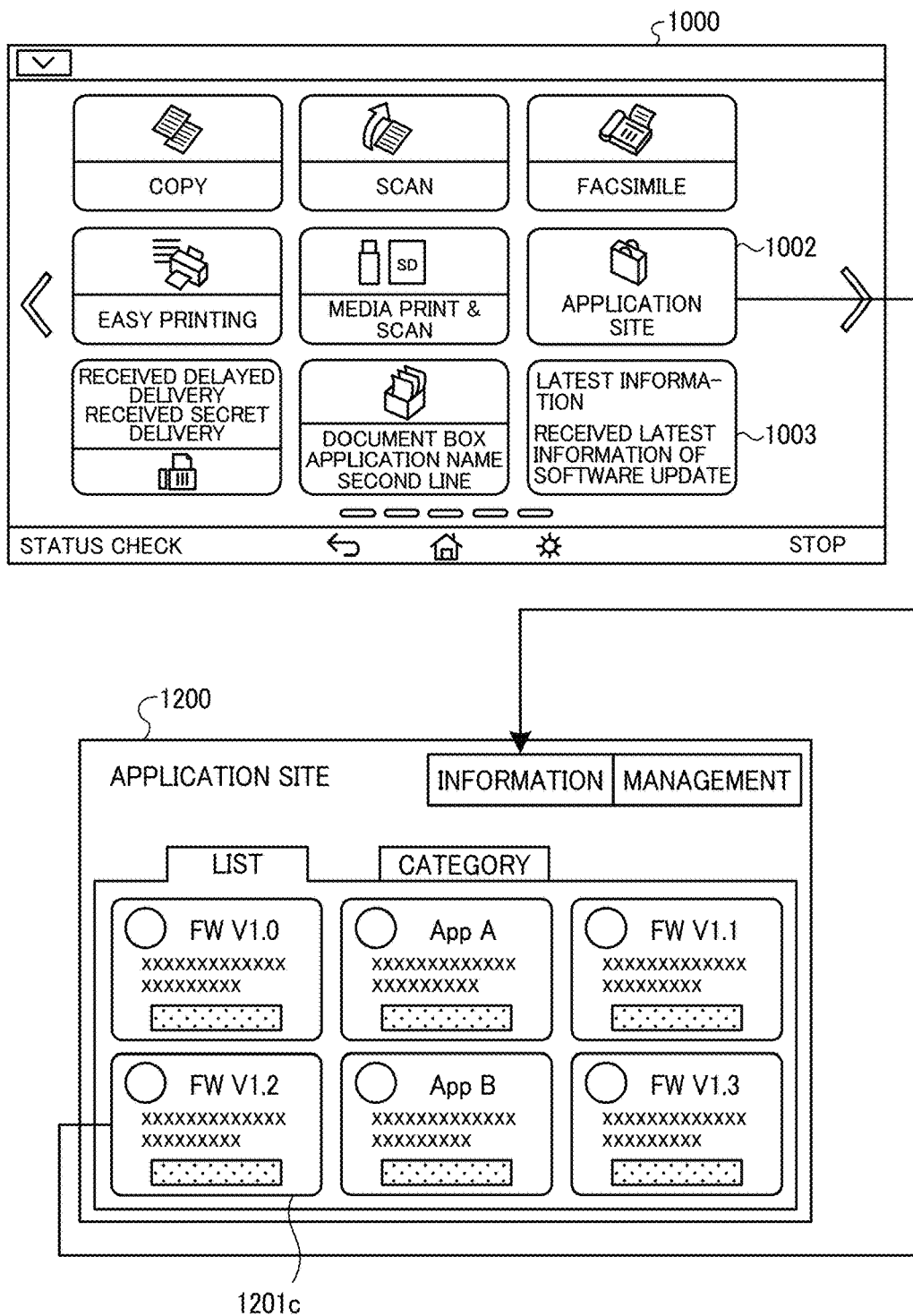

ELECTRONIC APPARATUS, INFORMATION PROCESSING SYSTEM, AND INFORMATION PROCESSING METHOD

CROSS-REFERENCE TO RELATED APPLICATIONS

This application is a continuation of U.S. application Ser. No. 16/896,223, filed Jun. 9, 2020, which claims priority pursuant to 35 U.S.C. § 119(a) to Japanese Patent Application No. 2019-121884, filed on Jun. 28, 2019 in the Japan Patent Office, the disclosure of each of which is incorporated by reference herein in its entirety.

BACKGROUND

Technical Field

This disclosure relates to an electronic apparatus, an information processing system, and an information processing method.

Background Art

Conventionally, a technique for automatically updating applications and firmware for electronic apparatuses, such as multifunction peripheral (MFP) is known.

As one technology for automatically updating the firmware, when an application is to be installed on an MFP from an application market site, which is a web site for distributing applications, the required firmware can be automatically updated.

Further, in another technology for automatically updating applications, if an application that can be updated exists at an application market site, the application at the MFP can be automatically updated.

However, if the firmware is automatically updated, the function of firmware may be changed irrespective of the user intention, and it is difficult to understand for users how the function has changed.

SUMMARY

In one aspect of the present invention, an electronic apparatus installable with firmware updatable via a network is devised. The electronic apparatus includes an input unit configured to receive an operation performed by a user; and circuitry configured to display, on a display, a first screen for displaying a first function of firmware that can be installed on the electronic apparatus, and a second screen for displaying a second function of the firmware, the second function including a plurality of second functions and the second screen including a plurality of second screens prepared for each one of the plurality of second functions; enable the first function in response to an operation for the first function displayed on the first screen input via the input unit; and enable the second function in response to an operation for the second function displayed on the second screen input via the input unit. The circuitry enables one or more of the second functions selected from the plurality of second functions respectively displayed on the plurality of second screens.

In another aspect of the present invention, an information processing system is devised. The information processing system includes a server; and an electronic apparatus connectable with the server via a network, the electronic apparatus installable with firmware updatable via the network. The server includes a memory configured to store one or more firmwares to be supplied to the electronic apparatus, and circuitry configured to transmit information of a first screen or information of a second screen for displaying one or more firmwares installable on the electronic apparatus, the first screen or the second screen is to be displayed on a display. The electronic apparatus includes an input unit configured to receive an operation performed by a user, and another circuitry configured to display, on the display, the first screen for displaying a first function of firmware that can be installed on the electronic apparatus, and the second screen for displaying a second function of the firmware, the second function including a plurality of second functions and the second screen including a plurality of second screens prepared for each one of the plurality of second functions, enable the first function in response to an operation for the first function displayed on the first screen input via the input unit, and enable the second function in response to an operation for the second function displayed on the second screen input via the input unit. The another circuitry enables one or more of the second functions selected from the plurality of second functions respectively displayed on the plurality of second screens.

In another aspect of the present invention, a method of processing information for updating firmware of an electronic apparatus via a network is devised. The method includes receiving an operation performed by a user, displaying, on a display, a first screen for displaying a first function of firmware that can be installed on the electronic apparatus, and a second screen for displaying a second function of the firmware, the second function including a plurality of second functions and the second screen including a plurality of second screens prepared for each one of the plurality of second functions, enabling the first function in response to an operation for the first function displayed on the first screen, and enabling the second function in response to an operation for the second function displayed on the second screen. The enabling enables one or more of the second functions selected from the plurality of second functions respectively displayed on the plurality of second screens.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 7A and 7B illustrate an example of screen transition;

FIGS. 9A and 9B illustrate still another example of screen transition;

Figure 1:
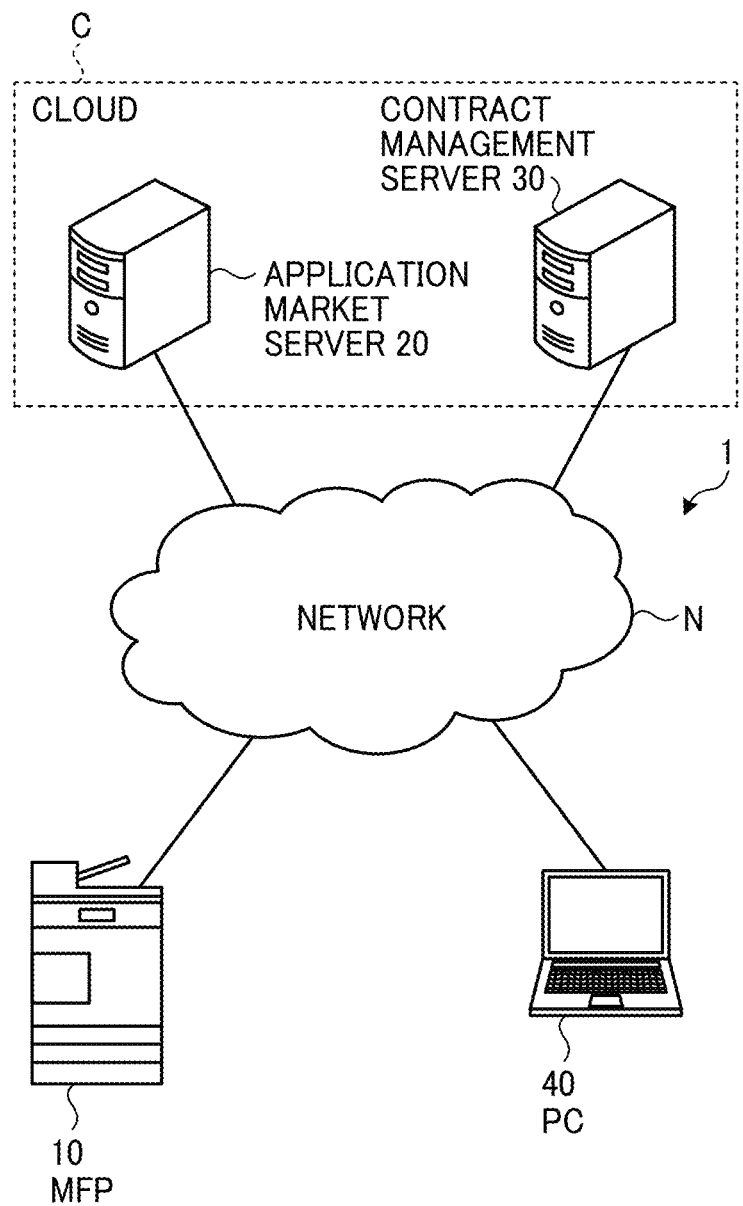
FIG. 1 illustrates an example of configuration of an information processing system according to an embodiment of this disclosure.

The accompanying drawings are intended to depict embodiments of this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an electronic apparatus, an information processing system, and an information processing method according to one or more embodiments of this disclosure in detail with reference to the accompanying drawings. Further, the following embodiments are not limited to this disclosure, and the components in the following embodiments may include those implemented by the skilled in the art, substantially identical, and in equivalent range. Further, various omissions, substitutions, modifications, and combinations of components can be made without departing from the scope of the following embodiments.

In this disclosure, computer software is a program related to computer operation, and information which is used for processing by computer, equivalent to the program (hereinafter, computer software is referred to as software). An application software is a generic name for software that is used to perform specific tasks, in software classification. An operating system (OS) is software for controlling computers and used for enabling application software to use computer resources. The operating system controls the basic management and control of computers, such as input and output control, memory and hard disk management, process management, and so on. The application software works with the functions provided by the operating system. A program is consisted with computer instructions that are combined to obtain computing results. The information equivalent to the program is not a program that directly instructs to the computer, but is similar to the program because the information equivalent to the program defines a computer processing. For example, a data structure (a logical structure of data, represented by a correlation between data elements) corresponds to the information equivalent to the program.

Hereinafter, a description is given of electronic apparatus according to this disclosure, such as multifunctional peripheral apparatus (MFP), which is an example of image forming apparatus, but is not limited thereto. For example, the electronic apparatus can be information processing apparatus, such as smartphone, portable telephone, and personal computer (PC), consumer electronics, industrial machine, built-in machine, medical device, or the like. Further, the multifunction peripheral apparatus (MFP) is an apparatus having a plurality of different functions, such as copying function, scanner function, printer function, and facsimile function.

(Configuration of Information Processing System)

FIG. 1 illustrates an example of configuration of an information processing system 1 according to an embodiment. Hereinafter, a description is given of a configuration of the information processing system 1 with reference to FIG. 1.

As illustrated in FIG. 1, the information processing system 1 includes, for example, a multifunction peripheral apparatus (MFP) 10, an application market server 20 (an example of server), a contract management server 30 (an example of another server), and a personal computer (PC) 40 (an example of information processing apparatus), which are communicatively connected to each other via a network N. The application market server 20 and the contract management server 30 are included in cloud C as the servers for providing cloud services.

The MFP 10 is an image forming apparatus, which is an example of electronic apparatus capable of performing various functions, such as copying function, scanner function, facsimile function, printer function, or the like.

The application market server 20 is a server that provides cloud services, which provides a list screen of one or more programs of application and one or more programs of firmware that can be installed on the MFP 10, and has an application market site, from which one or more programs of application and/or one or more programs of firmware selected by the user can be downloaded and installed on the MFP 10. In this description, the term of "application" may mean one or more programs of application, and the term of "firmware" may mean one or more programs of firmware.

The contract management server 30 is a server that provides cloud services of purchase site, which is used to make a purchase contract for a user who has logged in to a charged application and charged firmware, and manages a purchase contract status in association with tenant identification (ID), user ID, and device ID.

The PC 40 is an information processing apparatus that communicates with the contract management server 30 via the network N to make a purchase contract of charged application or firmware to be installed on the MFP 10.

Further, the service provided by the application market site is not limited to being implemented by the application market server 20 alone, but can be implemented by, for example, using a plurality of servers. The same applies to a purchase site of the contract management server 30.

(Hardware Configuration of MFP)

Figure 2:
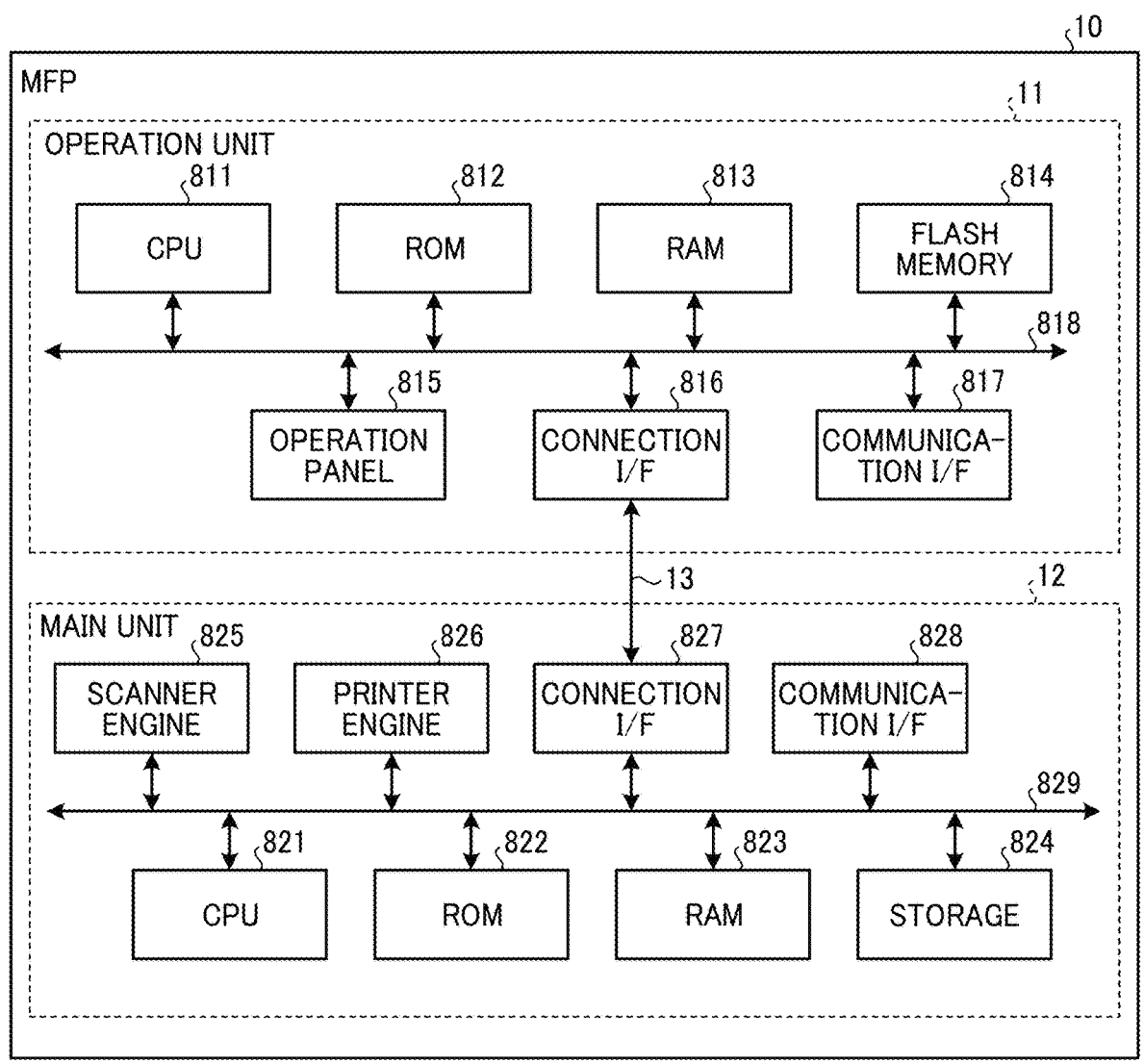
FIG. 2 is a diagram illustrating an example of a block diagram of a hardware configuration of MFP according to the embodiment of this disclosure.

FIG. 2 is an example of a block diagram of a hardware configuration of the MFP 10 according to the embodiment. Hereinafter, a description is given of a hardware configuration of the MFP 10 with reference to FIG. 2.

As illustrated in FIG. 2, the MFP 10 includes, for example, an operation unit 11, and a main unit 12. The operation unit 11 is configured to receive an user operation, and the main unit 12 is configured to implement various image forming functions, such as scanner function, and printer function. In this description, the receiving of user operation includes a process of receiving specific information input by the user operation (including a signal indicating coordinate values on screen).

The operation unit 11 and the main unit 12 are communicatively connected to each other via a communication path 13 dedicated for communication. The communication path 13 employs, for example, universal serial bus (USB) standard, but is not limited thereto. For example, the communication path 13 can employ any standards, such as wired or wireless standards.

The main unit 12 performs an operation corresponding to an operation received by the operation unit 11, which may be performed by a user or others. Further, the main unit 12 can also communicate with an external device, and can perform an operation corresponding to an instruction received from the external device.

(Hardware Configuration of Operation Unit)

As illustrated in FIG. 2, the operation unit 11 includes, for example, a central processing unit (CPU) 811, a read only memory (ROM) 812, a random access memory (RAM) 813, a flash memory 814, an operation panel 815, a connection interface (I/F) 816, a communication interface (I/F) 817, and bus 818.

The CPU 811 is a computing device that controls operations of the operation unit 11 entirely. The CPU 811 controls the operation of the operation unit 11 entirely by executing programs stored in the ROM 812 or flash memory 814 using the RAM 813 as a work area. For example, the CPU 811 implements various functions, such as displaying information (e.g., image) corresponding to the input received from a user on the operation panel 815.

The ROM 812 is a nonvolatile memory that stores basic input/output system (BIOS), various settings, or the like that are executed at the time of activating the operation unit 11. The RAM 813 is a volatile memory that is used as a work area of the CPU 811. The flash memory 814 is a nonvolatile storage device for storing, for example, operating system (OS), application programs, and various data.

The operation panel 815 is a device having a function that receives various inputs corresponding to the user operation, and having an input function and a display function for displaying various information (e.g., information corresponding to received operation, information indicating operation state of the MFP 10, setting information). The operation panel 815 includes, for example, a liquid crystal display (LCD) device equipped with a touch panel function. The operation panel 815 is not limited to the liquid crystal display device, but can be made of, for example, an organic electro-luminescence (OEL) display device equipped with a touch panel function. Further, the operation panel 815 may include an operation unit such as a hardware key or a display unit such as a lamp, in addition to or in place of the touch panel function.

The connection I/F 816 is an interface for communicating with the main unit 12 via the communication path 13.

The communication I/F 817 is a network interface for connecting the operation unit 11 to the network N and communicating with an external device connected to the network N. The communication I/F 817 corresponds to, for example, Ethernet (registered trademark), and is an interface capable of communication conforming to transmission control protocol/internet protocol (TCP/IP) or the like.

The bus 818 is a transmission path that connects each of the above-described components to each other, and transmits address signals, data signals, and various control signals.

Further, the hardware configuration of the operation unit 11 illustrated in FIG. 2 is just one example, and may include components other than the components illustrated in FIG. 2.

(Hardware Configuration of Main Unit)

As illustrated in FIG. 2, the main unit 12 includes, for example, a CPU 821, a ROM 822, a RAM 823, a storage 824, a scanner engine 825, a printer engine 826, a connection I/F 827, a communication I/F 828, and a bus 829.

The CPU 821 is a computing device that controls operations of the main unit 12 entirely. The CPU 821 controls the operation of the main unit 12 entirely by executing programs stored in the ROM 822 or the storage 824 using the RAM 823 as a work area. For example, the CPU 821 implements various functions, such as copy function, scanner function, facsimile function, and printer function.

The ROM 822 is a nonvolatile memory that stores BIOS, various settings, or the like that are executed when activating the main unit 12. The RAM 823 is a volatile memory that is used as a work area of the CPU 821. The storage 824 is a nonvolatile storage device that stores, for example, operating system (OS), various application programs, and various data. The storage 824 can be, for example, a hard disk drive (HDD), a solid state drive (SSD) or the like.

The scanner engine 825 is a hardware that performs a scanner function to scan and read one or more documents as images, among the image forming functions, which is other than general purpose information processing and processing communication.

The printer engine 826 is a hardware that performs a printer function of printing on a print medium such as paper or the like, among the image forming functions, which is other than general purpose information processing and processing communication.

The connection I/F 827 is an interface for communicating with the operation unit 11 via the communication path 13.

The communication I/F 828 is a network interface for connecting the main unit 12 to the network N and communicating with an external device connected to the network N. The communication I/F 828 is an interface that corresponds to, for example, Ethernet and that is capable of communication conforming to TCP/IP or the like.

The bus 829 is a transmission path that connects each of the above-described components to each other, and transmits address signals, data signals, and various control signals.

Further, the hardware configuration of the main unit 12 illustrated in FIG. 2 is just one example. The main unit 12 may include components other than those illustrated in FIG. 2. For example, the main unit 12 may include a finisher that sorts printed media, or a particular option such as auto document feeder (ADF) which automatically feeds documents.

(Hardware Configuration of Application Market Server)

Figure 3:
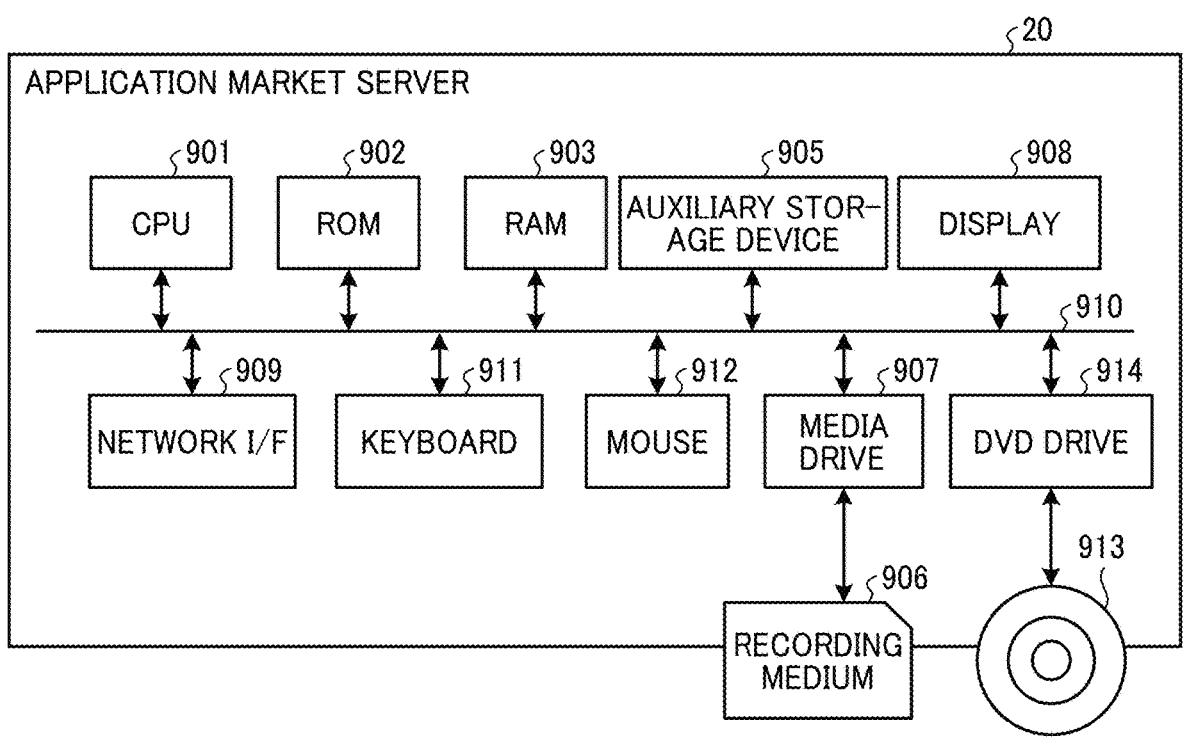
FIG. 3 illustrates an example of a block diagram of a hardware configuration of an application market server according to the embodiment of this disclosure.

FIG. 3 illustrates an example of a block diagram of a hardware configuration of the application market server 20 according to the embodiment. Hereinafter, a description is given of a hardware configuration of the application market server 20 with reference to FIG. 3.

As illustrated in FIG. 3, the application market server 20 includes, for example, a CPU 901, a ROM 902, a RAM 903, an auxiliary storage device 905, a media drive 907, a display 908, a network I/F 909, a keyboard 911, a mouse 912, and a digital versatile disc (DVD) drive 914.

The CPU 901 is a computing device that controls operations of the application market server 20 entirely. The ROM 902 is a nonvolatile storage device that stores programs for the application market server 20. The RAM 903 is a volatile storage device used as a work area of the CPU 901.

The auxiliary storage device 905 is a storage device such as HDD or SSD, which stores images scanned by the MFP 10 by performing the scanning function.

The media drive 907 is a device that controls reading and writing of data to a recording medium 906, such as flash memory, under the control of the CPU 901.

The display 908 is a display device composed of a liquid crystal or an organic electro-luminescence (OEL) that displays various information, such as cursor, menu, window, characters, images, or the like.

The network I/F 909 is an interface for communicating data with an external device such as MFP 10 using network N. The network I/F 909 is, for example, a network interface card (NIC) conforming to Ethernet, which is compatible with TCP/IP for communication.

The keyboard 911 is an input device used for selecting characters, numbers, various instructions, and a cursor movement. The mouse 912 is an input device for selecting and executing various instructions, selecting an object to be processed, and moving the cursor.

The DVD drive 914 is a device for controlling reading and writing of data to the DVD 913 such as DVD-ROM or digital versatile disk recordable (DVD-R) used as an example of removable storage medium.

The CPU 901, ROM 902, RAM 903, auxiliary storage 905, media drive 907, display 908, network I/F 909, keyboard 911, mouse 912 and DVD drive 914, as described above, are communicatively connected to each other by a bus line 910 such as an address bus and a data bus.

The hardware configuration of the application market server 20 illustrated in FIG. 3 is just one example, and it is not required to include all of the components illustrated in FIG. 3, or may include any other components.

Further, although the hardware configuration illustrated in FIG. 3 is described as the hardware configuration of the application market server 20, the hardware configuration of the contract management server 30 and the PC 40 is also corresponding to the hardware configuration illustrated in FIG. 3.

(Software Configuration in Information Processing System)

Figure 4:
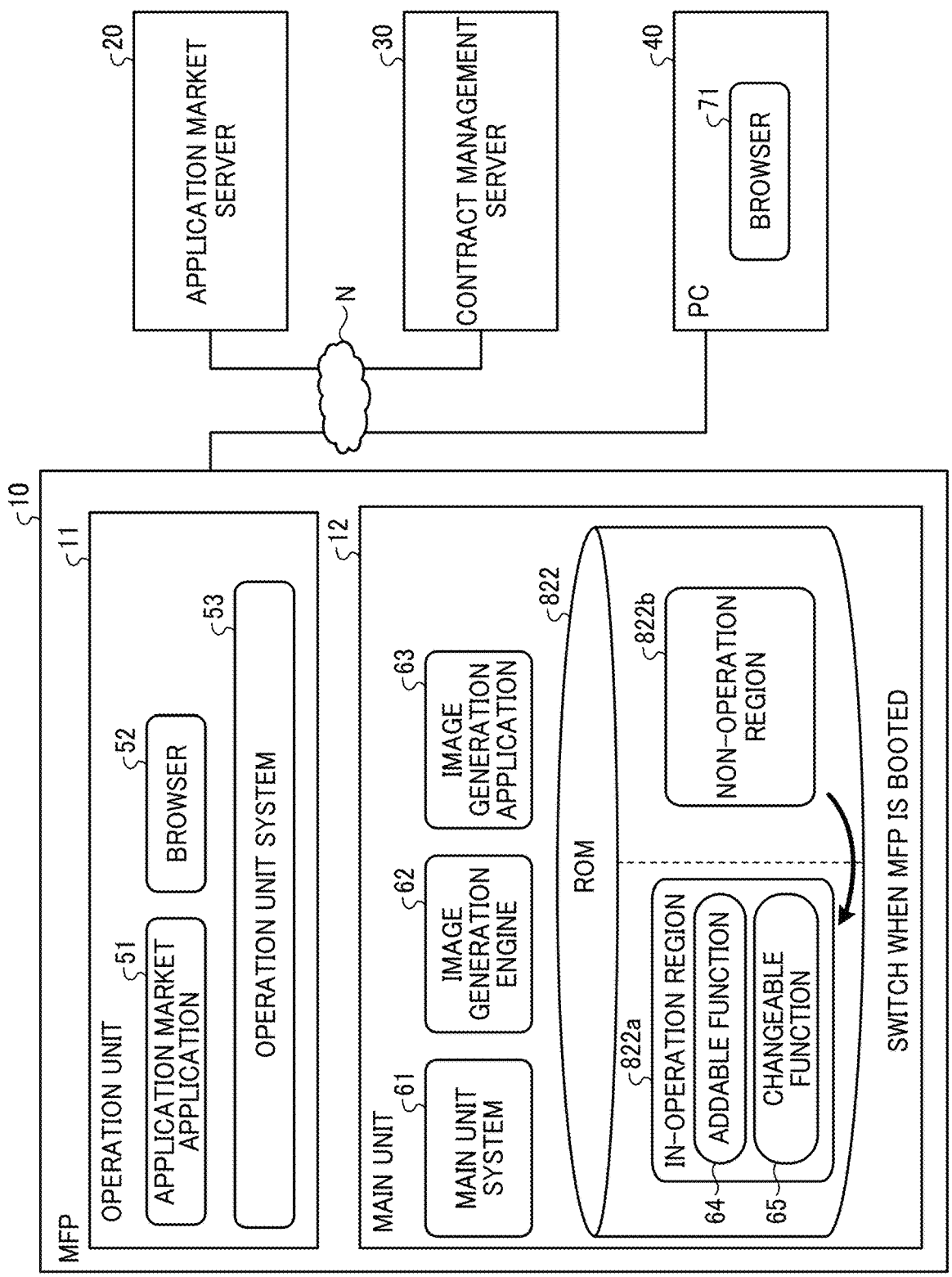
FIG. 4 is an example of software configuration of the information processing system according to the embodiment of this disclosure.
Figure 5:
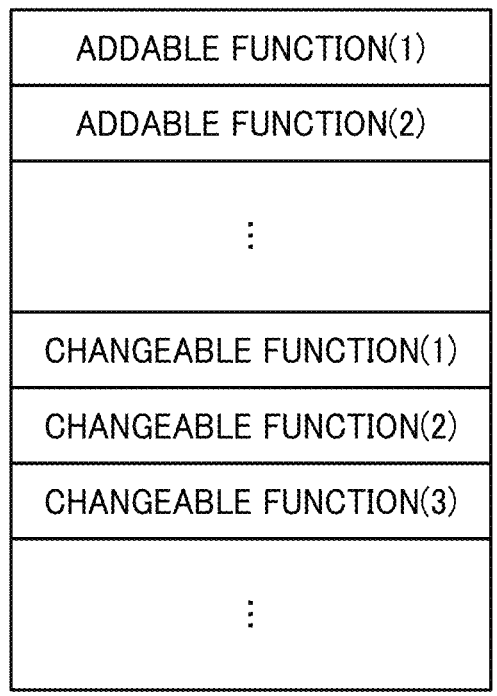
FIG. 5 is an example of function configuration of firmware to be updated.

FIG. 4 is an example of software configuration of the information processing system 1 according to the embodiment. FIG. 5 is an example of function configuration of firmware to be updated. Hereinafter, a description is given of a software configuration of the information processing system 1 with reference to FIGS. 4 and 5.

As illustrated in FIG. 4, the operation unit 11 includes, for example, an application market application 51, a browser 52, and an operation unit system 53.

The application market application 51 is an application that communicates with an application market site provided by the application market server 20 to download application or firmware corresponding to a user operation via the browser 52.

The browser 52 is software that implements functions, such as web applications, by acquiring web contents (e.g., hypertext markup language (HTML), cascading style sheets (CSS), JavaScript (registered trademark), and various electronic files from the application market server 20.

The operation unit system 53 is software that controls operations of the operation unit 11 other than the function implemented by the browser 52.

As illustrated in FIG. 4, the main unit 12 includes, for example, a main unit system 61, an image generation engine 62, and an image generation application 63.

The main unit system 61 is a software that controls the operation of the main unit 12.

The image generation engine 62 corresponds to the scanner engine 825 and the printer engine 826 described above. The image generation application 63 is an application that controls the operations of the image generation engine 62. For example, the image generation application 63 includes copy application, scanner application, facsimile application, printer application, or the like.

As illustrated in FIG. 4, the ROM 822 includes an in-operation region 822*a* and a non-operation region 822*b*. The non-operation region 822*b* is used to temporarily store a firmware downloaded from the application market server 20 and retaining the firmware at a non-executed state. The in-operation region 822*a* is used to store a firmware that actually controls the operation of the operation unit 11 and the main unit 12.

Among the functions of the firmware stored in the in-operation region 822*a* and actually executed. a software that implements an addable function (first function) is referred to as an addable function 64, while a software that implements a changeable function (second function) is referred to as a changeable function 65.

The addable function is a function that does not cause any effect to user operability of the MFP 10 among the functions provided by the firmware. The addable function includes, for example, a reservation function of copy operation, and an interrupt function during the copying operation.

Further, the changeable function is a function that causes some effect to user operability of the MFP 10 among the functions provided by the firmware, such as a function of changing user interface (UI) of the operation screen displayed on the display unit 112. The changeable function includes, for example, an initial setting function accompanied by changing of user interface (UI).

Alternatively, for example, the addable function may be a new function firstly provided by a firmware having a specific version, and a function of adding a value for user by updating a firmware, which may be used as a function having a greater value for user. By contrast, the changeable function may be a function of changing or modifying the firmware function of previous version.

Users and administrators who use devices or apparatuses can select a certain version of firmware from multiple versions listed on the operation panel of the device or apparatuses, and can update the firmware to the version selected from the installed version. In this situation, the addable function can be displayed with the function description at the time of selection as new function or primary function of the selected version of firmware, and the users can collectively recognize the addable function. As to the changeable function, the changeable function changes the previous functional unit that may cause a sudden change to the user and may reduce user convenience, and thereby the changeable function is required to be selected one by one.

For example, the firmware stored in the ROM 822 (in-operation region 822a) has a functional configuration as illustrated in FIG. 5. That is, in an example case of FIG. 5, the functions newly provided by the firmware having the function version of "V1.0" include addable functions (1), (2), . . . and changeable functions (1), (2), (3), . . . .

As to be described later, in the embodiment, if the automatic activation setting is turned off and the entire function activation setting is turned off, and a desired firmware is to be installed, the addable function is displayed to a user using a dialog box to describe the function collectively, and the user can select whether to activate the addable function.

Further, as to the changeable function, the changeable function is displayed to a user using a dialog box to describe or explain description of each changeable function one by one, and the user can select whether or not to enable the changeable function one by one. The operation of enabling the addable function and changeable function will be described later. In this description, the enabling of function, such as addable function and changeable function, of firmware that is installed (or updated) may be also referred to as the activation of function.

As illustrated in FIG. 4, the PC 40 includes, for example, a browser 71. The browser 71 is software that implements functions, such as web applications by obtaining web contents (e.g., HTML, CSS, JavaScript, various electronic files) from the contract management server 30.

(Functional Configuration of Information Processing System)

Figure 6A:
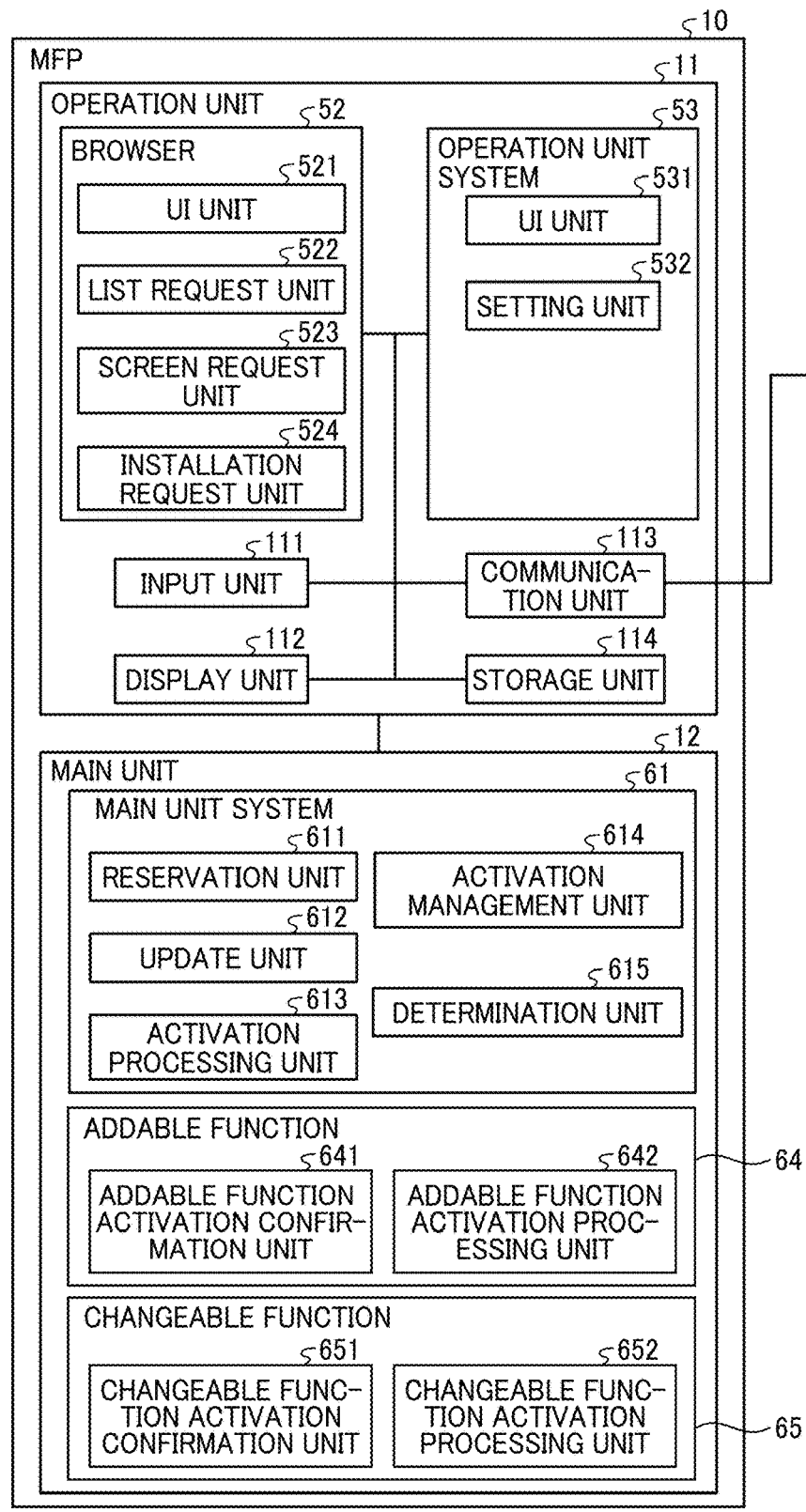
FIGS. 6A and 6B illustrate an example of a block diagram of a functional configuration of the information processing system according to the embodiment of this disclosure.
Figure 6B:
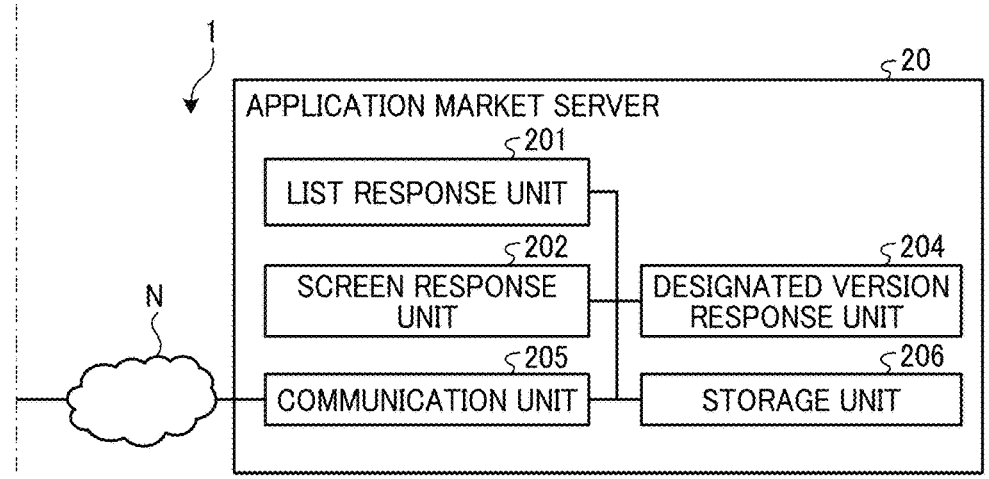

FIGS. 6A and 6B illustrate an example of a block diagram of a functional configuration of the information processing system 1 according to the embodiment. Hereinafter, a description is given of a functional configuration of the information processing system 1 with reference to FIGS. 6A and 6B.

As illustrated in FIGS. 6A and 6B, the operation unit 11 of the MFP 10 includes, for example, the browser 52 and the operation unit system 53, an input unit 111, a display unit 112, a communication unit 113, and a storage unit 114. The browser 52 includes, for example, a user interface (UI) unit 521 (an example of display control unit), a list request unit 522, a screen request unit 523, an installation request unit 524. The operation unit system 53 includes, for example, a UI unit 531 (an example of display control unit), and a setting unit 532.

The UI unit 521 is a functional that displays a web page or the like corresponding to specific content, acquired from the application market server 20, using the display unit 112. Further, the UI unit 521 receives various operations (e.g., press for link) on the web page according to an inputting operation by a user to the input unit 111. The UI unit 521 is implemented by executing the browser 52 by the CPU 811 of the operation unit 11 illustrated in FIG. 2.

The list request unit 522 is a functional unit that requests a list of application and/or firmware installable on the MFP 10 to the application market server 20, in response to an inputting operation performed by a user to the input unit 111.

The list request unit 522 is implemented by executing the browser 52 by the CPU 811 of the operation unit 11 illustrated in FIG. 2.

The screen request unit 523 is a functional unit that requests information on various screens, to be displayed using the display unit 112, to the application market server 20 in response to an inputting operation performed by a user to the input unit 111. The screen request unit 523 is implemented by executing the browser 52 by the CPU 811 of the operation unit 11 illustrated in FIG. 2.

The installation request unit 524 is a functional unit that requests the application market server 20 for installing a designated firmware in response to an inputting operation performed by a user to the input unit 111. In the embodiment, the "installation" of firmware means that a firmware is stored (updated) in the ROM 822 (specifically, the non-operation region 822b), a firmware is stored in the in-operation region 822a and is in an executable state, and activating the function (addable function, changeable function) of the executable firmware, or the like. The installation request unit 524 is implemented by executing the browser 52 by the CPU 811 of the operation unit 11 illustrated in FIG. 2.

The UI unit 531 is a functional unit that displays a screen (e.g., home screen, to be described later) used for performing various operations of the MFP 10, using the display unit 112. The UI unit 531 is implemented by executing the operation unit system 53 by the CPU 811 of the operation unit 11 illustrated in FIG. 2.

The setting unit 532 is a functional unit that sets various settings, in response to an inputting operation performed by a user to the input unit 111 on various setting screens (e.g., automatic update setting screen, automatic activation setting screen, to be described later) displayed using the display unit 112. The setting unit 532 is implemented by executing the operation unit system 53 by the CPU 811 of the operation unit 11 illustrated in FIG. 2.

The input unit 111 is a functional unit that receives an inputting operation performed by a user. The input unit 111 is implemented by an input function of the operation panel 815 illustrated in FIG. 2.

The display unit 112 is a functional unit that displays various information in accordance with the instructions of the UI unit 521 and the UI unit 531. The display unit 112 is implemented by a display function of the operation panel 815 illustrated in FIG. 2.

The communication unit 113 is a functional unit that performs data communication with the application market server 20 via the network N in under the control of the browser 52. The communication unit 113 is implemented by the communication I/F 817 and executing the program by the CPU 811 illustrated in FIG. 2.

The storage unit 114 is a functional unit that stores various data. For example, the storage unit 114 stores setting information set on an automatic update setting screen, an automatic activation setting screen, and an entire function enabling setting screen, to be described later. The storage unit 114 is implemented by the RAM 813 or flash memory 814 illustrated in FIG. 2.

Further, as illustrated in FIGS. 6A and 6B, the main unit 12 of the MFP 10 includes, for example, a reservation unit 611, an update unit 612, a activation processing unit 613 (main activation processing unit), an activation management unit 614, a determination unit 615, an addable function activation confirmation unit 641 (first activation confirmation unit, first enablement confirmation unit), an addable function activation processing unit 642 (an example of enablement unit, first enablement unit), an changeable function activation confirmation unit 651 (second activation confirmation unit, second enablement confirmation unit), and an changeable function activation processing unit 652 (an example of enablement unit, second enablement unit).

When a user designates or selects a specific firmware having a specific function version, the reservation unit 611 reserves an enabling of the addable function corresponding to the specific function version after updating the designated specific firmware. The information of function corresponding to the specific function version reserved by the reservation unit 611 may be temporarily stored, for example, in the RAM 823 or storage 824 illustrated in FIG. 2. The reservation unit 611 is implemented by executing the main unit system 61 by the CPU 821 of the main unit 12 illustrated in FIG. 2.

The update unit 612 is a functional unit that updates the specific firmware downloaded from the application market server 20 via the communication unit 113 into the non-operation region 822b of the ROM 822 (an example of storage unit) illustrated in FIG. 4. The update unit 612 is implemented by executing the main unit system 61 by the CPU 821 of the main unit 12 illustrated in FIG. 2.

The activation processing unit 613 is a functional unit that copies the specific firmware updated in the non-operation region 822b of the ROM 822 by the update unit 612 to the in-operation region 822a of the ROM 822, and executes the specific firmware when the MFP 10 is activated (booted) or rebooted. As to be described later, even if a specific or particular firmware stored in the operation region 822a is to be executed by the activation processing unit 613, the addable function and changeable function included in the specific or particular firmware can be executed only if a user performs the installation operation (operation for activation) to enable the specific function, such as the addable function and changeable function.

Therefore, after the user recognizes a screen prompting to enable (activate) each of the addable function and changeable function, and then the user performs the installation operation (operation for activation) described above, each function is in the executable state for the first time. The activation processing unit 613 is implemented by the main unit system 61 executed by the CPU 821 of the main unit 12 illustrated in FIG. 2.

Further, for example, when the addable function or changeable function is activated, and then each function of the addable function or the changed function is in the executable state, setting information for determining whether or not to execute the function actually can be further provided.

For example, even if the changeable function is activated, if the setting information for the changeable function is set not to execute, the changeable function is not be executed, in which the changeable function can be executed for the first time if the setting information is set to execute.

The activation management unit 614 is a functional unit that manages the maximum function version of addable function that can be activated using currently installed and executable firmware (hereinafter, referred to as the maximum function version), and the function version of addable function being activated using currently installed and executable firmware (hereinafter, referred to as current function version).

For example, when the firmware function version is "V1.0," the function version of the addable function is also referred to as "V1.0," and the function version of the changeable function is also referred to as "V1.0."

For example, when the firmware of "FW V1.2" is installed in the executable state, the maximum function version becomes "V1.2." That is, the firmware of "FW V1.2" has a function version of "V1.2," and if the addable function of "V1.2" is activated, the function version corresponding to the activated addable function is "V1.2," and "V1.2" becomes the maximum function version.

Further, for example, when the firmware of "FW V1.2" is installed on the MFP 10 in the executable state, the maximum function version becomes "V1.2," however, if only the addable function up to "V1.1" is activated using the firmware, the current function version becomes "V1.1."

The activation management unit 614 also manages which changeable function of which function version is activated. The activation management unit 614 is implemented by executing the main unit system 61 by the CPU 821 of the main unit 12 illustrated in FIG. 2.

The determination unit 615 compares a function version of a firmware designated by a user, the maximum function version, and a current function version to determine which function is greater. The determination unit 615 is implemented by executing the main unit system 61 by the CPU 821 of the main unit 12 illustrated in FIG. 2.

The addable function activation confirmation unit 641 is a functional unit that checks or confirms whether an activation is instructed to the current function version at a particular time of the MFP 10, and an activation is instructed to the addable function included in a particular function version that is greater than the current function version. The addable function activation confirmation unit 641 is implemented by executing the addable function 64 of the firmware that is installed in the executable state on the main unit 12 illustrated in FIG. 2.

The addable function activation processing unit 642 activates an addable function of a designated particular firmware having a particular function version in accordance with an installation operation (activation operation) to the input unit 111 by a user. The addable function activation processing unit 642 is implemented by executing the addable function 64 of the firmware that is installed in the executable state on the main unit 12 illustrated in FIG. 2.

The changeable function activation confirmation unit 651 is a functional unit that checks or confirms a currently-activated changeable function and a function version of the currently-activated changeable function, and an activation state of the changeable function corresponding to the function version of the newly activated addable function. The changeable function activation confirmation unit 651 is implemented by executing the changeable function 65 of the firmware that is installed in the executable state on the main unit 12 illustrated in FIG. 2.

The changeable function activation processing unit 652 is a functional unit that activates each changeable function of a designated particular firmware having a particular function version in accordance with an installation operation (activation operation) to the input unit 111 by a user. The changeable function activation processing unit 652 is implemented by executing the changeable function 65 of the firmware that is installed in the executable state on the main unit 12 illustrated in FIG. 2.

Thus, by updating the pre-installed firmware and the application of the electronic apparatus, such as the MFP 10, the latest function can be added to the electronic apparatus. This technology is referred to as "always current technology (ACT)" in the embodiment. The electronic equipment equipped with the ACT function can acquire, via the network N, the latest function that was not installed at the time of purchase as a firmware package, and can add the latest function as the function.

Further, the firmware package for adding the function via the network N becomes public at a given time on the application market server 20 that is an acquisition destination of firmware. Therefore, the time lag between the development of the function to be added to the electronic equipment and the installation of the function can be reduced, and thereby the new function can be added to the electronic apparatus in a timely manner. Further, conventionally, a user may buy the electronic apparatus for utilizing new function. In the embodiment, since the user is not required to buy the electronic apparatus itself for utilizing the new function, the cost of user can be reduced.

Further, the functional units of the operation unit 11 and the main unit 12 of the MFP 10 illustrated in FIGS. 6A and 6B are conceptually illustrated, and are not limited to the configuration of the FIGS. 6A and 6B. For example, a plurality of functional units of the MFP 10 illustrated in FIGS. 6A and 6B as independent functional units may be configured as one functional unit. On the other hand, the function of one functional unit of the MFP 10 illustrated in FIGS. 6A and 6B may be divided into a plurality of functions, and a plurality of functional units may be formed.

Further, for example, in the operation unit 11, the functional unit implemented by the browser 52 and the functional unit implemented by the operation unit system 53 do not need to be clearly distinguished from each other, and the functional unit implemented by the browser 52 may be implemented by the operation unit system 53, and vice versa. Further, a software different from the browser 52 and the operation unit system 53 may implement the function of each functional unit.

Further, the addable function activation confirmation unit 641 and the addable function activation processing unit 642 are functions that are implemented by the addable function 64, but is not limited thereto. For example, a software (e.g., main unit system 61) different from the addable function 64 may have functions of the addable function activation confirmation unit 641 and the addable function activation processing unit 642. The same applies to the changeable function activation confirmation unit 651 and the changeable function activation processing unit 652.

Further, as illustrated in FIGS. 6A and 6B, the application market server 20 includes, for example, a list response unit 201, a screen response unit 202, a designated version response unit 204, a communication unit 205 (transmission unit), and a storage unit 206.

The list response unit 201 is a functional unit that generates a list of application and/or firmware installable on the MFP 10, and transmits the list of application and/or firmware to the MFP 10 via the communication unit 205, in response to a request of the list request unit 522 of the MFP 10. The list response unit 201 is implemented by executing the program by the CPU 901 illustrated in FIG. 3.

The screen response unit 202 is a functional unit that transmits information on various screens (e.g., home screen) to the MFP 10 via the communication unit 205, in response to a request of the screen request unit 523 of the MFP 10. The screen response unit 202 is implemented by executing the program by the CPU 901 illustrated in FIG. 3.

The designated version response unit 204 is a functional unit that responds to the main unit system 61 of the MFP 10, a specific function version of a specific firmware which is requested to be installed by the installation request unit 524 of the MFP 10. The designated version response unit 204 is implemented by executing the program by the CPU 901 illustrated in FIG. 3.

The communication unit 205 is a functional unit that performs data communication with the MFP 10 and the contract management server 30 via the network N. The communication unit 205 is implemented by the network I/F 909 and executing the program by the CPU 901 illustrated in FIG. 3.

The storage unit 206 is a functional unit that stores various programs, such as application, firmware and packages combining one or more programs of application and/or firmware. The storage unit 206 is implemented by the auxiliary storage device 905 illustrated in FIG. 3.

Further, the functional units of the application market server 20 illustrated in FIGS. 6A and 6B are conceptually illustrated, and are not limited to the configuration of the FIGS. 6A and 6B. For example, a plurality of functional units of the application market server 20 illustrated in FIGS. 6A and 6B as independent functional units may be configured as one functional unit. On the other hand, the function of one functional unit of the application market server 20 illustrated in FIGS. 6A and 6B may be divided into a plurality of functions, and a plurality of functional units may be formed.

Further, the functional units of the MFP 10, and the application market server 20 illustrated in FIGS. 6A and 6B may be implemented by executing various software, but is not limited thereto. For example, at least any functional units may be implemented by a dedicated hardware circuit, such as an integrated circuit.

(Screen and Screen Transition on MFP)

Figure 7B:
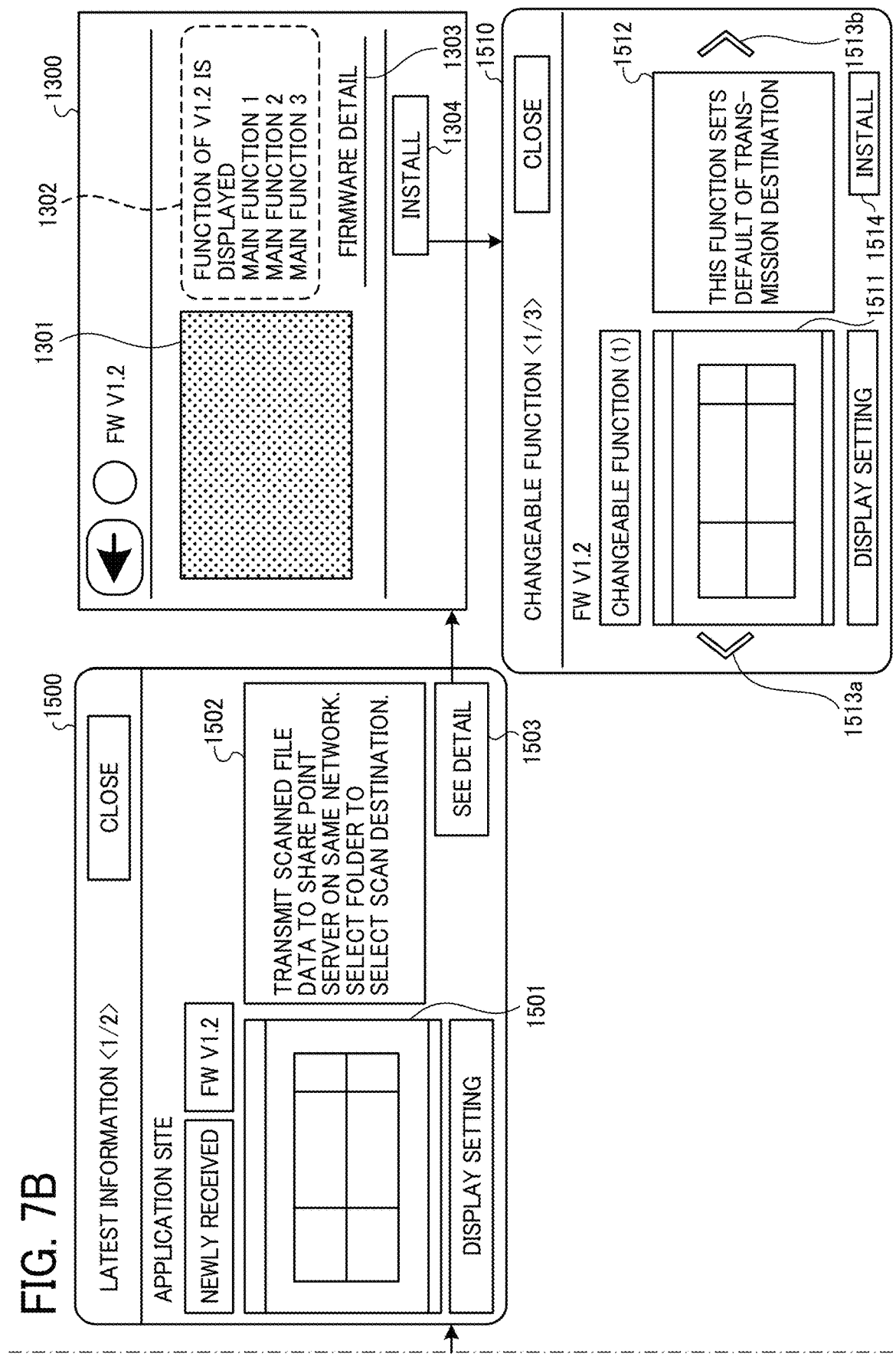
Figure 8:
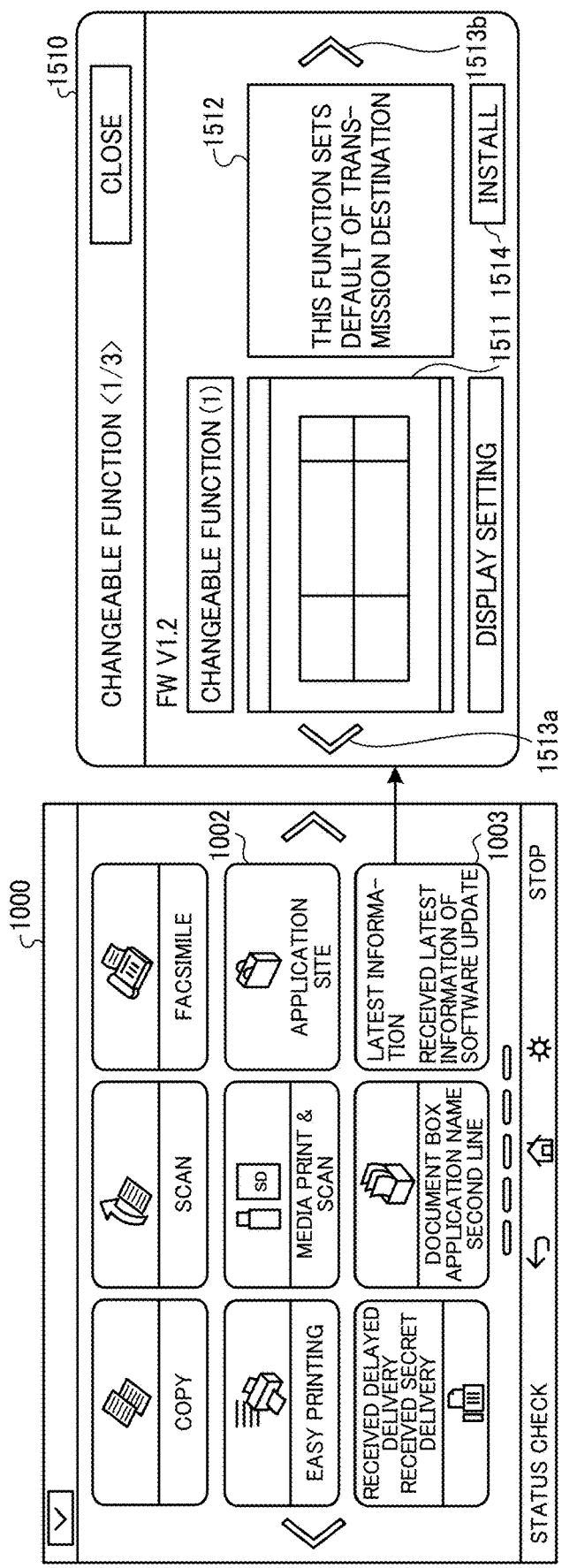
FIG. 8 illustrates another example of screen transition.
Figure 10:
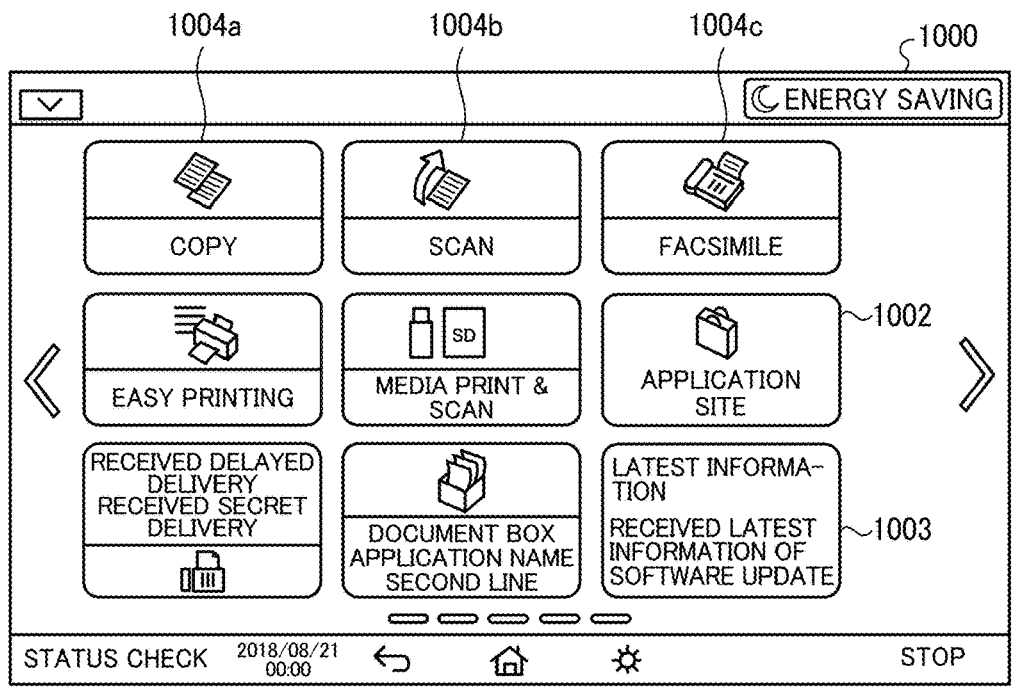
FIG. 10 illustrates an example of home screen.
Figure 11:
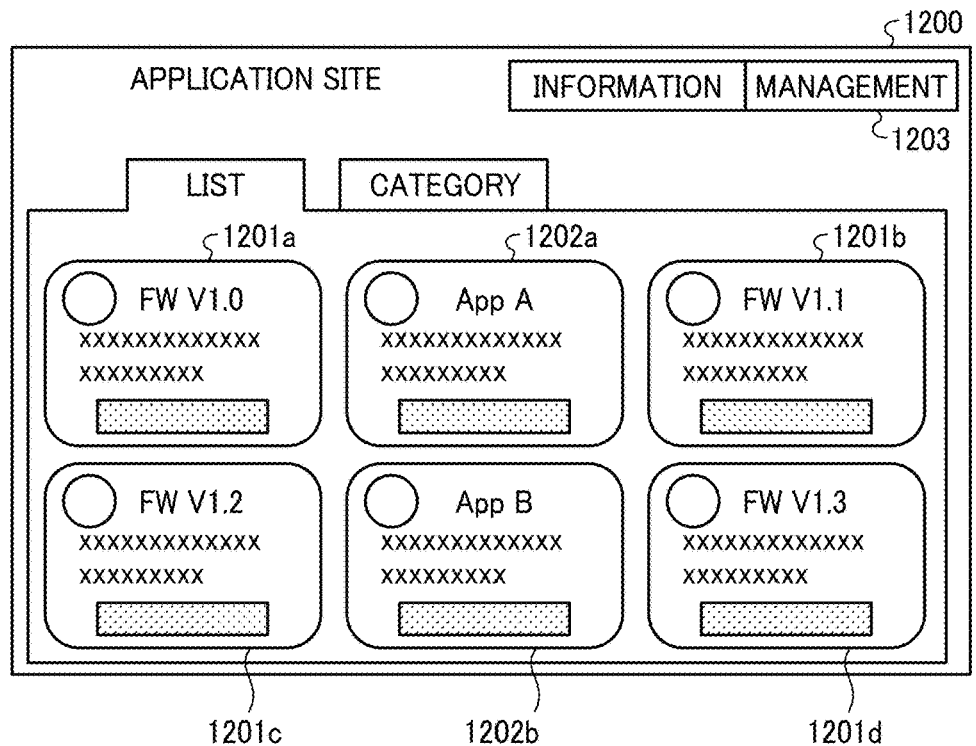
FIG. 11 illustrates an example of list screen of application and firmware, which displays target application and firmware that can be installed from an application site.
Figure 12:
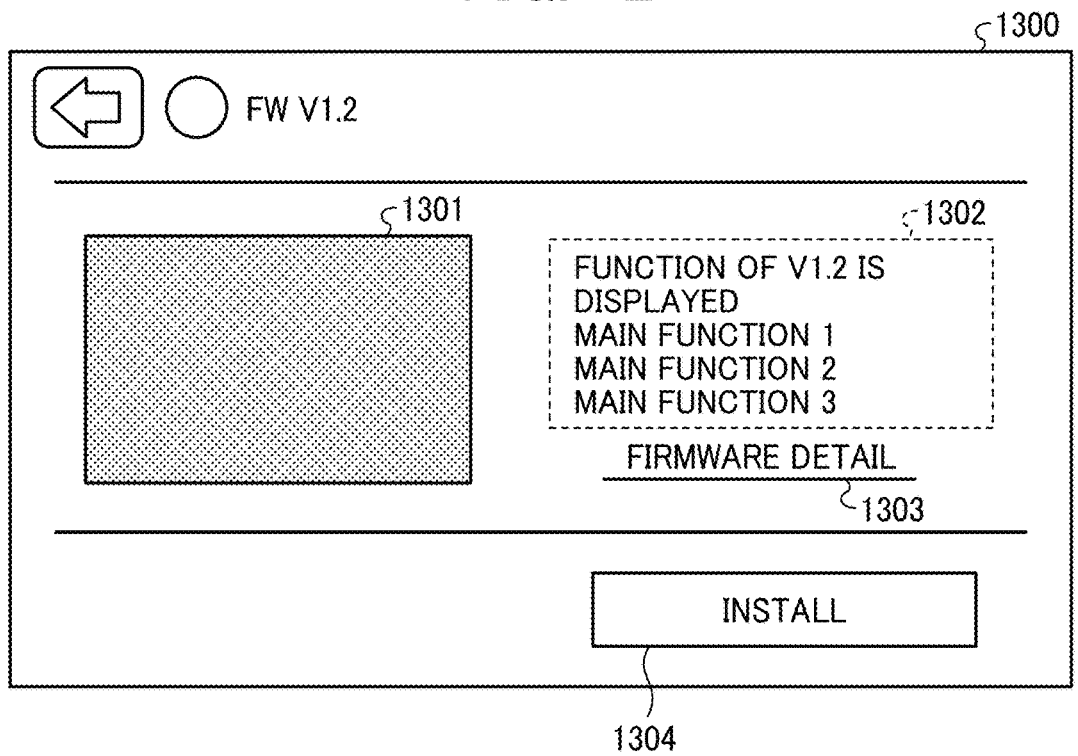
FIG. 12 illustrates an example of installation screen used for installing a firmware.
Figure 13:
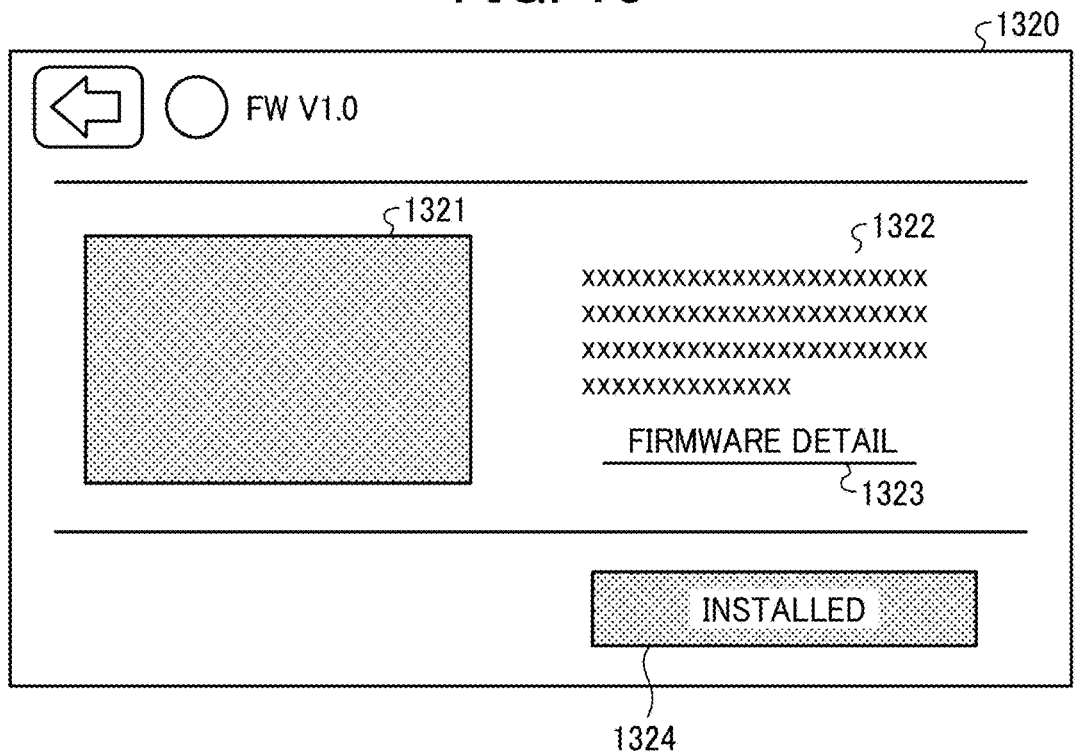
FIG. 13 illustrates an example of installation screen used for already installed firmware.

FIGS. 7 to 9 illustrate examples of screen transition. FIG. 10 illustrates an example of home screen. FIG. 11 illustrates an example of list screen of application and firmware, which displays target application and firmware that can be installed from an application site. FIG. 12 illustrates an example of installation screen used for installing a firmware. FIG. 13 illustrates an example of installation screen used for an already installed firmware. Hereinafter, a description is given of a screen displayed on the MFP 10 and a flow of screen transition with reference to FIGS. 7 to 13.

Hereinafter, a description is given of a transition operation from the home screen 1000 to a screen used for activating the addable function and changeable function with reference to FIGS. 7A and 7B. As illustrated in FIGS. 7A and 7B, the home screen 1000 being displayed using the display unit 112 of the MFP 10 includes, for example, an application site button 1002 used for displaying a list screen of application and firmware (to be described later) that can be installed on the MFP 10, and a widget 1003.

The widget 1003 is a display area and button displaying the latest information on the MFP 10. In an example case of FIGS. 7A and 7B, the widget 1003 displays a message indicating that the "latest information: received latest information of software update" and informs a user that a software can be updated. As illustrated in FIG. 10, the home screen 1000 includes, for example, the application site button 1002, the widget 1003, a copy button 1004a used for performing copy processing, a scanner button 1004b used for performing scanning processing, and a facsimile button 1004c used for performing facsimile processing.

If the user presses the widget 1003, the UI unit 531 instructs the display unit 112 to display a notification dialog box 1500 (an example of first screen) illustrated in FIG. 7B.

The notification dialog box 1500 is a screen used for displaying which firmware can be installed (or activated)

specifically. For example, the notification dialog box 1500 is a screen used for installing (or activating) a firmware having the latest function version. As illustrated in FIGS. 7A and 7B, the notification dialog box 1500 includes, for example, a screen shot display section 1501, a description display section 1502, and a detail button 1503. In an example case of FIG. 7B, the notification dialog box 1500 displays the firmware of "FW V1.2."

The screen shot display section 1501 is a section used for displaying an operation state of the concerned firmware being displayed by the notification dialog box 1500 as a screen shot.

The description display section 1502 is a display section used for describing the operation of the concerned firmware.

The detail button 1503 is a button used for displaying an installation screen used for performing an installation (activation) operation of the concerned firmware.

For example, as illustrated in FIG. 7B, if the user presses the detail button 1503 to install the firmware of "FW V1.2," the UI unit 521 instructs the display unit 112 to display the installation screen 1300 (an example of first screen) used for installing the concerned firmware.

As illustrated in FIG. 12, the installation screen 1300 displays a screen shot display section 1301 used for displaying an operation state of the concerned firmware, a description display section 1302 used for describing a specific function (addable function, changeable function) of the concerned firmware, a detail link section 1303 used for shifting or transitioning to a screen displaying details of the function of the concerned firmware, and an installation button 1304 used for performing an installation processing (or activation processing).

Thus, a user can confirm the contents of function (addable function, changeable function) of the concerned firmware described on each screen by checking the contents of the notification dialog box 1500 and the installation screen 1300. Then, after the confirmation, the user can decide whether to activate the addable function of the concerned firmware.

Then, as illustrated in FIG. 7B, if the user presses the installation button 1304 to install the firmware of "FW V1.2," after performing various processing (to be described later with reference to FIG. 17), the addable function activation processing unit 642 activates the addable function of the concerned firmware, and then the UI unit 531 instructs the display unit 112 to display a changeable function dialog box 1510 (an example of second screen) used for activating each changeable function. That is, the user can select whether to activate the addable function of the concerned firmware, being displayed, by performing an operation on the installation screen 1300. For example, if the user selects not to activate the addable function, by pressing a close button or cancel button on the installation screen 1300, the addable function activation processing unit 642 does not activate the addable function, and then the UI unit 531 may instruct the display unit 112 to display the changeable function dialog box 1510.

As illustrated in FIG. 7B, the changeable function dialog box 1510 is a screen used for activating the changeable function of the concerned firmware introduced in the notification dialog box 1500 and the installation screen 1300, one by one. The changeable function dialog box 1510 includes, for example, a screen shot display section 1511, a description display section 1512, a return button 1513a, a proceed button 1513b, and an installation button 1514.

The screen shot display section 1511 is a section used for displaying an operation state of the changeable function of the concerned firmware introduced by the notification dialog box 1500 as a screen shot.

The description display section 1512 is a display section used for describing the operation of the changeable function of the concerned firmware.

The return button 1513a is a button used for returning to a display of changeable function dialog box of a particular changeable function that was displayed most recently, for one or more changeable functions of the concerned firmware.

The proceed button 1513b is a button used for proceeding to a display of a particular changeable function dialog box to be displayed next, for one or more changeable functions of the concerned firmware.

The installation button 1514 is a button used for activating the changeable function displayed in the changeable function dialog box 1510.

Thus, the user can check the specific contents of the changeable function included in the concerned firmware by checking the changeable function dialog box 1510. Then, after the confirmation, the user can decide whether to activate each changeable function of the concerned firmware.

Then, as illustrated in FIG. 7B, if a user presses the installation button 1514 to activate the firmware changeable function of "FW V1.2," after performing various processing (to be described later with reference to FIG. 17), the changeable function activation processing unit 652 activates the changeable function of the concerned firmware. That is, the user can select whether or not to activate each changeable function by selecting any one of changeable functions included in the concerned firmware by performing an operation to the changeable function dialog box 1510. For example, if the user is to activate only a target changeable function among the changeable functions, the changeable function dialog box corresponding to the target changeable function is displayed, and the installation button is pressed to activate the target changeable function. As to the changeable function that is not to be activated, the user press the close button (see FIGS. 7A and 7B) without performing the above operation to close the changeable function dialog box.

As described above, by pressing the widget 1003 displaying the latest information on the MFP 10 on the home screen 1000, for example, the notification dialog box 1500 describing the latest firmware that can be installed (or activated) is displayed, with which the user can check the contents of the concerned firmware, and then the use can activate the addable function and the selected target function individually, and the installation operation can be easily performed.

Hereinafter, with reference to FIG. 8, a description is given of a transition operation of screen when the addable function of the latest firmware introduced on the notification dialog box 1500 is activated, and then all of the changeable functions are not activated on the changeable function dialog box 1510 that is displayed after activating the addable function of the latest firmware introduced on the notification dialog box 1500.

If the user presses the widget 1003 on the home screen 1000, since the addable function of the firmware described in the widget 1003 has already been activated, the UI unit 531 skips the notification dialog box 1500 and the installation screen 1300 of FIGS. 7A and 7B, and displays the changeable function dialog box 1510 for the changeable function of the latest firmware that has not been activated yet. With this processing, among the changeable function of the latest firmware, an activation operation can be easily performed for a particular changeable function that has not been yet activated.

Hereinafter, with reference to FIGS. 9A and 9B, a description is given of transition operation from the home screen 1000 to a screen used for activating the addable function and changeable function using a different way compared to the screen transition illustrated in FIGS. 7A and 7B.

Figure 9B:
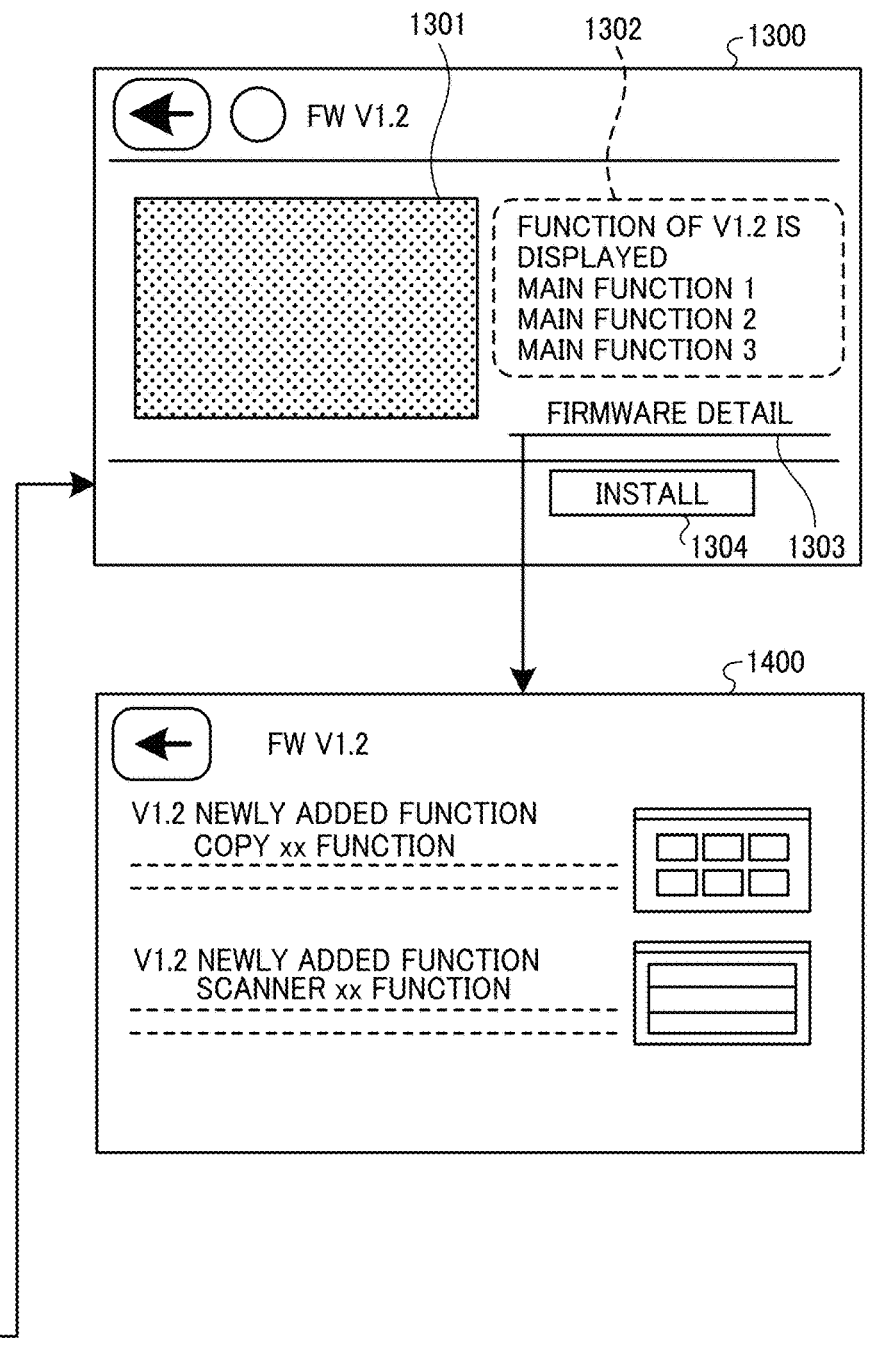

As illustrated in FIGS. 9A and 9B, if a user presses the application site button 1002 on the home screen 1000, being displayed using the display unit 112 of the MFP 10, the UI unit 521 instructs the display unit 112 to display a list of a plurality of applications and firmwares that can be installed on the MFP 10 on the display unit. 1200.

The list screen 1200 is a screen used for displaying a list of a plurality of applications and firmwares installable on the MFP 10. The list screen 1200 displays a list of button icons used for installing each application. and a list of button icons used for installing each firmware.

In this description, the "installable application" is not limited to an application that is not currently installed or activated, but includes an application that have already been installed or activated. That is, the list screen 1200 displays the list of application and firmware. The application includes one or more programs of application that can be updated, and one or more programs of application that are already installed. The firmware includes one or more programs of firmware that can be updated, one or more programs of firmware that are already installed and function of the one or more programs of firmware can be activated, and one or more programs of firmware that are already installed and a function of the one or more programs of firmware are already activated.

In an example case of FIG. 11, the list screen 1200 includes buttons corresponding to firmwares, such as, a firmware button 1201a corresponding to "FW V1.0," a firmware button 1201b corresponding to "FW V1.1," a firmware button 1201c corresponding to "FW V1.2," and a firmware button 1201d corresponding to "FW V1.3." Further, the list screen 1200 includes, for example, an application button 1202a corresponding to "App A" and an application button 1202b corresponding to "App B" as buttons for applications. Further, the list screen 1200 includes, for example, a management button 1203 for setting various settings.

Further, the list screen 1200 may display only one or more programs of the application and firmware not yet installed, or only a list of one or more programs of firmware having one or more of the function versions that are not yet activated.

Then, among the list displayed on the list screen 1200 being displayed by the UI unit 521, the user presses a button of firmware or a button of application, desired to be installed by the user. For example, as illustrated in FIGS. 9A and 9B, if the user presses the firmware button 1201c to install the firmware of "FW V1.2," the UI unit 521 instructs the display unit 112 to display the installation screen 1300 used for installing the firmware of "FW V1.2."

The layout and function of the installation screen 1300 are as described above. For example, as illustrated in FIGS. 9A and 9B, if a user touches the detail link section 1303, the UI unit 521 instructs the display unit 112 to display a detail screen 1400 used for displaying one or more functions of the concerned firmware in detail. The detail screen 1400 is a screen used for displaying a detailed description of the newly added function for the firmware of "FW V1.2."

Hereinafter, a description is given of the installation screen in detail. It is assumed that the firmware having the function version of "V1.0" is installed on the MFP 10, and the addable function corresponding to the function version of "V1.0" is already activated in the MFP 10. In this example case, the maximum function version is "V1.0," and the current function version is also "V1.0." Further, it is assumed that all of the changeable functions corresponding to the function version of "V1.0" are also already activated.

In this example case, if the user presses the firmware button 1201c used for installing the firmware of "FW V1.2" on the list screen 1200 (FIG. 11), the installation screen 1300 of the firmware having the function version of "FW V1.2" is displayed as illustrated in FIG. 12.

If the user presses the installation button 1304 on the installation screen 1300 (FIG. 12), it becomes clear that the user wants to use the function corresponding to the function version of "V1.2," and if the firmware of "FW V1.2" is not yet downloaded from the application market server 20, the firmware of "FW V1.2" is downloaded from the application market server 20 and installed, and then the addable function corresponding to the function version of "V1.2" is activated.

Further, if the user presses the firmware button 1201a on the list screen 1200 to install the firmware of "FW V1.0" (FIG. 11), an installation screen 1320 of the firmware of "FW V1.0" is displayed as illustrated in FIG. 13. As illustrated in FIG. 13, the installation screen 1320 includes, for example, a screen shot display section 1321, a description display section 1322, a detail link section 1323, and an installed display section 1324. The functions of the screen shot display section 1321, the description display section 1322, and the detail link section 1323 are similar to those of the screen shot display section 1301, the description display section 1302, and the detail link section 1303 of the installation screen 1300 described above.

However, as described above, as to the state of the firmware of the MFP 10, the maximum function version is "V1.0," and the current function version is also "V1.0." Since all of the changeable functions of "V1.0" have been activated already, there is no need to install the firmware having the function version of "V1.0," and a message of "installed" is displayed on the installed display section 1324 instead of the installation button 1304 of FIG. 12. Therefore, the user can recognize that the concerned firmware selected on the list screen 1200 has already been installed, and the function (addable function, changeable function) of the function version of the concerned firmware has already been activated.

Further, if the updating the concerned firmware and activation of all of the addable function and changeable function are completed for the concerned firmware displayed on the widget 1003, the display of the concerned firmware disappears from the widget 1003.

However, even if the activation of any one of the addable function and changeable function is not yet completed, the displaying of the widget 1003 for a longer period of time may have some problem. Therefore, it can be configured that, within a certain period of time (e.g., one week) after the latest firmware is displayed on the widget 1003, if the activation of any one of the addable function and changeable function is not yet completed, the notification dialog box 1500 or the changeable function dialog box 1510 may be displayed by touching the widget 1003 by a user. Then, when the certain period of time elapses, even if all of the functions of the latest firmware are not yet activated, the notification dialog box 1500 or the changeable function dialog box 1510 may not be displayed by touching the widget 1003 by the user.

(Automatic Update Setting and Automatic Activation Setting)

Figure 14:
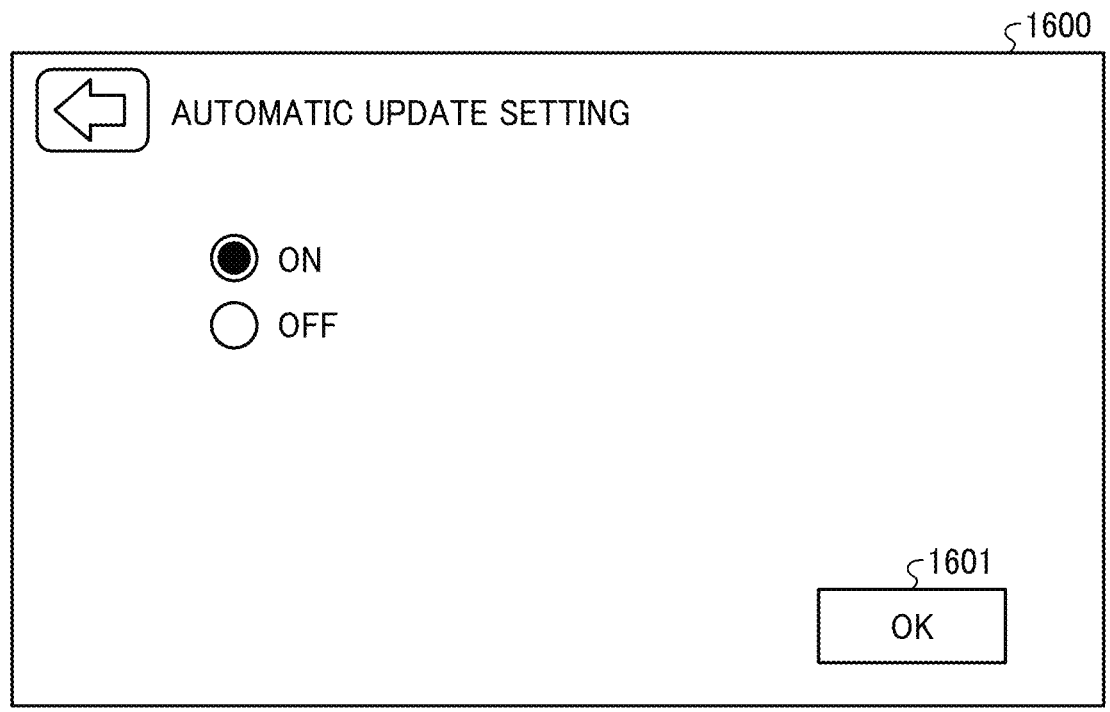
FIG. 14 illustrates an example of automatic update setting screen.
Figure 15:
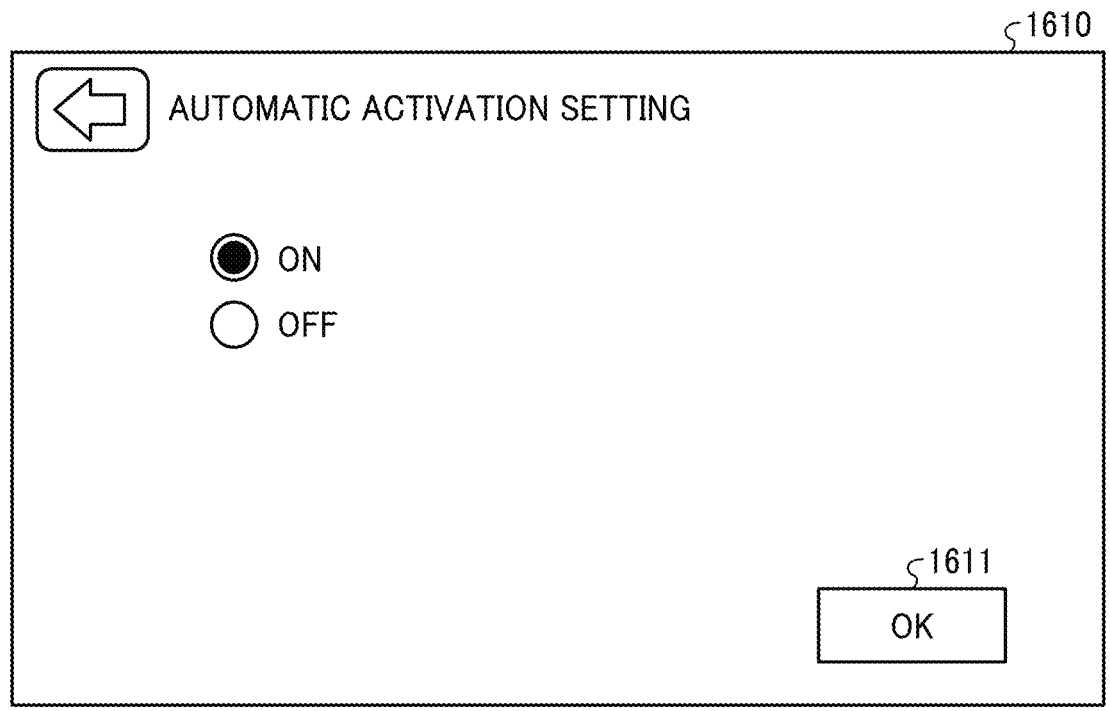
FIG. 15 illustrates an example of automatic activation setting screen.
Figure 16:
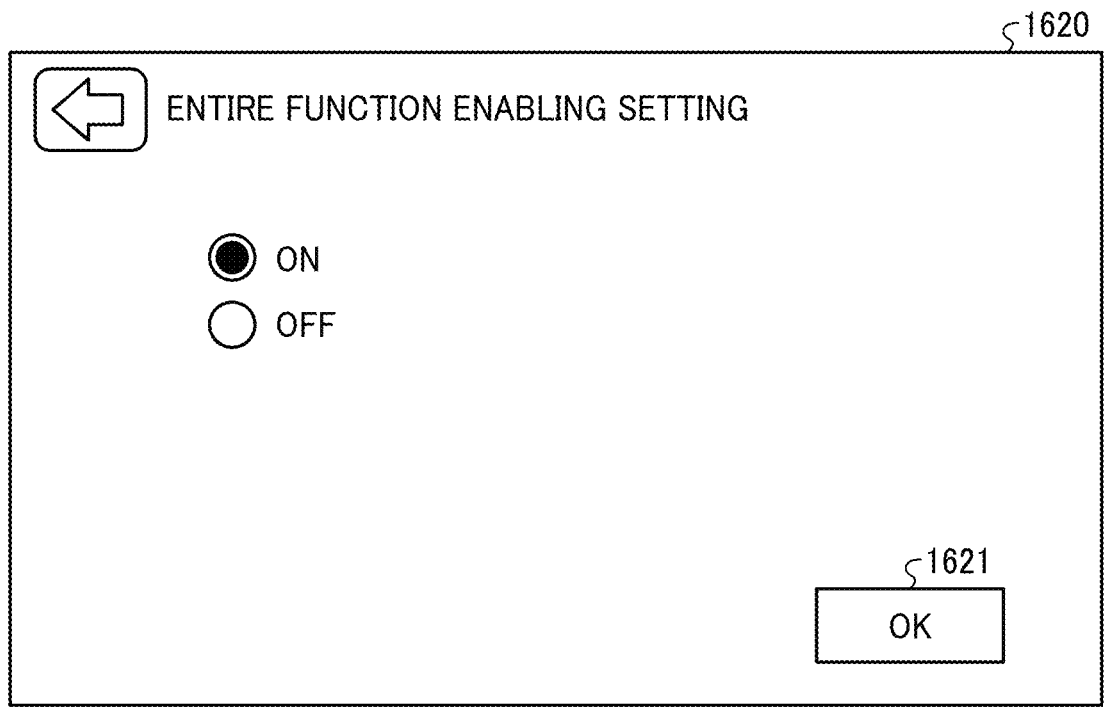
FIG. 16 illustrates an example of entire function enabling setting screen.

FIG. 14 illustrates an example of automatic update setting screen. FIG. 15 illustrates an example of automatic activation setting screen. FIG. 16 illustrates an example of entire function enabling setting screen. Hereinafter, with reference to FIGS. 14 to 16, a description is given of an automatic update setting of firmware, an automatic activation setting of function of the firmware, and an entire function enabling setting of function of the firmware.

If a user presses the management button 1203 on the list screen 1200 (FIG. 11), the UI unit 531 instructs the display unit 112 to display an automatic update setting screen 1600 illustrated in FIG. 14, an automatic activation setting screen 1610 illustrated in FIG. 15, or an entire function enabling setting screen 1620 illustrated in FIG. 16.

Further, the list screen 1200 may include management buttons, respectively used for displaying the automatic update setting screen 1600, the automatic activation setting screen 1610, and the entire function enabling setting screen 1620. Further, when the management button 1203 is pressed, the automatic update setting screen 1600, the automatic activation setting screen 1610 or the entire function enabling setting screen 1620 is displayed, and then the automatic update setting screen 1600, the automatic activation setting screen 1610, and the entire function enabling setting screen 1620 may be freely transitioned.

The automatic update setting screen 1600 (see FIG. 14) is a screen used for determining whether the MFP 10 downloads a concerned new firmware from the application market server 20 and then to install (update) the concerned new firmware in a case of upgrading the firmware currently installed on the MFP 10 to the concerned new firmware when the new firmware is released from the application market server 20. After a user sets ON/OFF on the automatic update setting screen 1600 and then presses OK button 1601, the setting unit 532 stores the concerned setting information in the storage unit 114.

For example, if the automatic update setting of the firmware is turned "ON" on the automatic update setting screen 1600, and then the installation request unit 524 of the MFP 10 receives a notice of releasing of a version-upgraded firmware from the application market server 20 via the communication unit 113, the installation request unit 524 automatically transmits an installation request of the version-upgraded firmware to the application market server 20. Then, the update unit 612 automatically downloads the version-upgraded firmware from the application market server 20 via the communication unit 113, and then updates and store the version-upgraded firmware in the non-operation region 822b of the ROM 822.

The automatic activation setting screen 1610 (see FIG. 15) is a screen used for determining whether to set the automatic activation for the addable function of the concerned firmware at the time of installing the version-upgraded firmware on the MFP 10. After a user sets ON/OFF on the automatic activation setting screen 1610 and then presses OK button 1611, the setting unit 532 stores the concerned setting information in the storage unit 114.

For example, if the automatic activation is turned "OFF" on the automatic activation setting screen 1610 and the automatic updating is turned "ON" on the automatic update setting screen 1600, and if the concerned firmware displayed on the installation screen is already automatically downloaded and updated, and then the installation button on the installation screen is pressed, the addable function activation processing unit 642 performs the activation process of the function of the concerned firmware only.

Further, if the automatic activation is turned "ON" on the automatic activation setting screen 1610 and the automatic updating is turned "ON" on the automatic update setting screen 1600, and then the installation request unit 524 automatically transmits an installation request of the concerned firmware, the update unit 612 automatically downloads the concerned firmware and updates the concerned firmware in the non-operation region 822b of the ROM 822, and then the addable function activation processing unit 642 automatically performs the activation process of the function of the concerned firmware.

The entire function enabling setting screen 1620 (see FIG. 16) is a screen used for setting whether all of the changeable functions of the concerned firmware are to be activated automatically at the time when the addable function of the concerned firmware is activated. After the user sets ON/OFF on the entire function enabling setting screen 1620 and then presses OK button 1621, the setting unit 532 stores the concerned setting information in the storage unit 114.

For example, when the entire function enabling setting is turned "ON" on the entire function enabling setting screen 1620, and the automatic activation setting is turned "ON" on the automatic activation setting screen 1610, if the addable function is activated by pressing the installation button 1304 on the notification dialog box 1500 and the installation screen 1300 (FIGS. 7A and 7B), the changeable function activation processing unit 652 automatically performs the activation processing for all of the changeable functions.

(Installation and Activation of Firmware in Information Processing System)

Figure 17:
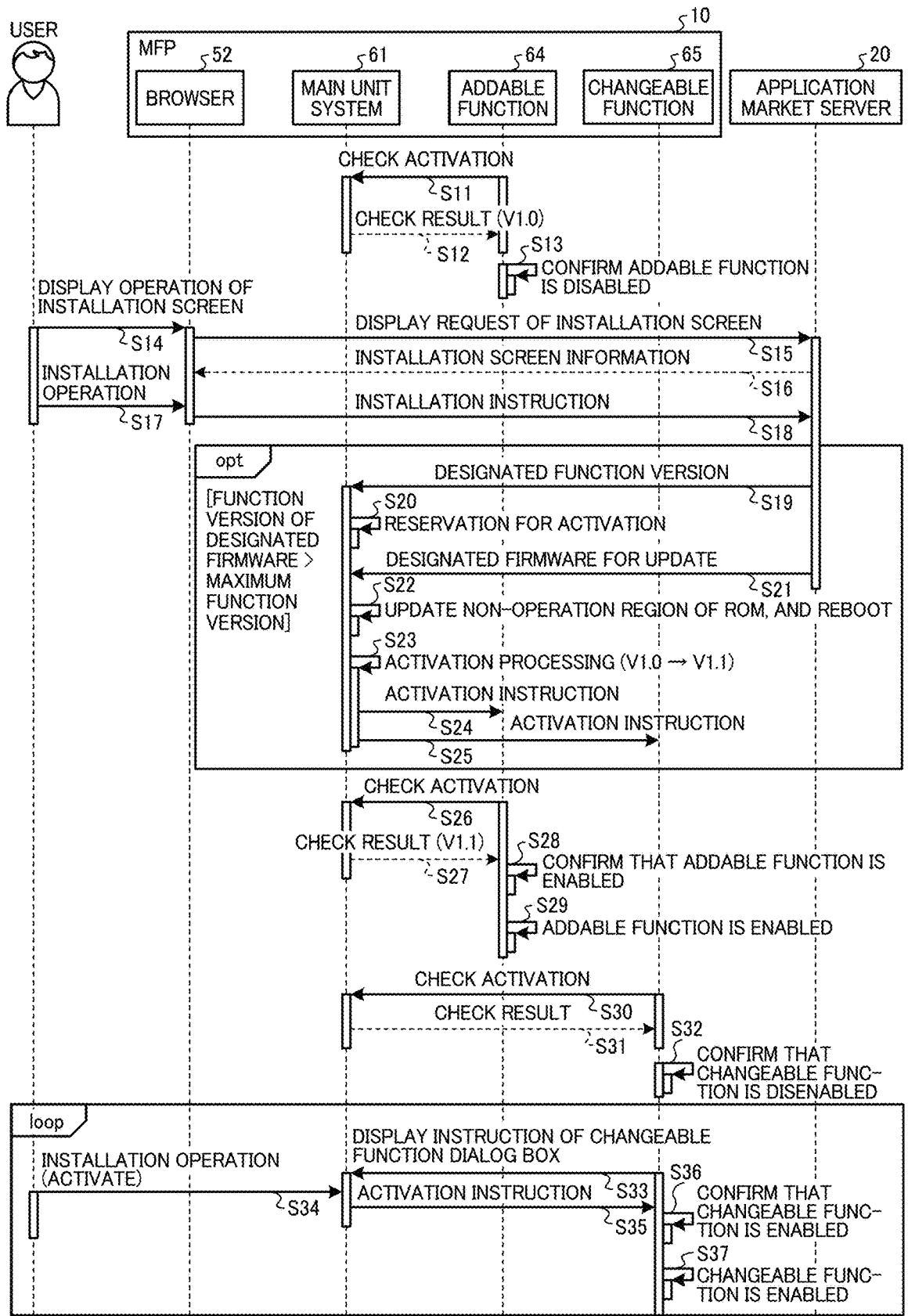
FIG. 17 is an example of sequence diagram illustrating operation when to install a software program.

FIG. 17 is an example of sequence diagram illustrating operation when to install a software program. Hereinafter, with reference to FIG. 17, a description is given of a flowchart of firmware installation operation and firmware activation operation in the information processing system 1.

(Steps S11, S12, S13) For example, when the MFP 10 is activated or booted, the addable function activation confirmation unit 641, implemented by the addable function 64 of the firmware being installed at the time of the booting of the MFP 10, checks or confirms whether an activation instruction of the current function version at the time of the booting of the MFP 10 is issued to the activation management unit 614, and an activation instruction of the addable function corresponding to the function version greater than the current function version is issued to the activation management unit 614.

In an example case of FIG. 17, it is assumed that the addable function activation confirmation unit 641 confirms that the current function version at the time of the booting of the MFP 10 is "V1.0," and the activation instruction of the addable function corresponding to the function version greater than the current function version is not issued. That is, the addable function activation confirmation unit 641 checks or confirms that the addable function corresponding to the function version greater than the current function version (e.g., "V1.1") is disabled, that is the function version greater than the current function version is not activated.

(Steps S14, S15) A user touches the widget 1003 on the home screen 1000 using the input unit 111 of the MFP 10 to display the notification dialog box 1500, and then the user presses the detail button 1503 to display the installation screen 1300 of the firmware having the function version of "V1.1" introduced in the notification dialog box 1500. Then, the screen request unit 523 of the MFP 10 transmits a display request of an installation screen of the firmware having the function version of "V1.1" to the application market server 20 via the communication unit 113.

(Step S16) In response to receiving the display request of the installation screen from the MFP 10, the screen response unit 202 of the application market server 20 transmits information of installation screen (installation screen information) of the firmware having the function version of "V1.1" to the MFP 10 via the communication unit 205. Then, the UI unit 521 of the MFP 10 displays the installation screen of the firmware having the function version of "V1.1" using the display unit 112 based on the installation screen information received from the application market server 20.

(Steps S17, S18) If the user presses the installation button on the installation screen via the input unit 111, the installation request unit 524 of the MFP 10 transmits an installation instruction (including activation) for requesting the designated firmware to the application market server 20 via the communication unit 113. Thus, when the user presses the installation button on the installation screen, it becomes clear that the user wants to use the function of firmware having the function version confirmed by the user.

(Steps S19, S20, S21, S22) Then, the determination unit 615 of the MFP 10 compares the function version of the designated firmware (i.e., designated function version of "V1.1") and the maximum function version of the currently-installed firmware to determine which function version is greater. In this example case, it is assumed that the function version of the designated firmware is "V1.1" while the maximum function version of the currently-installed firmware is "V1.0." In this example case, the firmware currently installed cannot support the addable function corresponding to the function version of the designated firmware, and thereby the firmware is required to be updated with the designated firmware.

In response to receiving the installation instruction from the installation request unit 524, the designated version response unit 204 of the application market server 20 transmits the function version of "V1.1" of the designated firmware to the MFP 10 via the communication unit 205. Then, as to the function version of "V1.1" of the firmware designated by the user, the reservation unit 611 of the MFP 10 makes a reservation for activating the addable function corresponding to the function version of "V1.1" after updating the firmware designated by the user. The information of function version reserved by the reservation unit 611 is temporarily stored, for example, in the RAM 823 or the storage 824 illustrated in FIG. 2.

Then, the update unit 612 of the MFP 10 downloads the designated firmware having the function version of "V1.1" from the application market server 20 via the communication unit 113, and updates and stores the designated firmware in the non-operation region 822b of the ROM 822. Then, after the updating unit 612 updates the designated firmware in the non-operation region 822b, the activation processing unit 613 of the MFP 10 reboots the MFP 10.

(Steps S23, S24, S25) Then, the activation processing unit 613 copies the firmware, updated in the non-operation region 822b of the ROM 822 by the update unit 612, into the in-operation region 822a at the rebooting time, and performs the processing for executing the firmware. That is, the activation processing unit 613 activates the addable function 64 and the changeable function 65 of the firmware copied to the in-operation region 822a. However, as above described, since the addable function provided by the addable function 64, and the changeable function provided by the changeable function 65 are not executable if the addable function provided by the addable function 64 and the changeable function provided by the changeable function 65 are not activated, at this stage, the functions of the addable function 64 and the changeable function 65 are not yet in the executable state.

Further, if the automatic updating is turned "ON" on the automatic update setting screen 1600, the latest firmware is already updated to the ROM 822, in which the processing of steps S20 to S25 is skipped.

(Steps S26, S27, S28, S29) Then, the addable function activation confirmation unit 641, implemented by the addable function 64 of the installed firmware, checks or confirms to the activation management unit 614 whether an activation (enabling) instruction of the addable function corresponding to the function version greater than the current function version of "V1.0" is issued. In an example case of FIG. 17, it is assumed that the addable function activation confirmation unit 641 confirms that the current function version of the MFP 10 is "V1.0" at this stage, and the addable function activation confirmation unit 641 confirms that the activation instruction of addable function corresponding to the function version of "V1.1," greater than the current function version of "V1.0," is issued (e.g., the addable function activation confirmation unit 641 confirms based on the activation instruction to the addable function 64 in step Then, the addable function activation processing unit 642 activates or enables the addable function that is to be implemented by the addable function 64.

Further, if the automatic update is turned "ON" on the automatic update setting screen 1600 and the automatic activation is turned "ON" on the automatic activation setting screen 1610, the latest firmware is updated in the ROM822, and when the concerned firmware is executed, the addable function is automatically activated. In this case, for example, if the user presses the installation button on the install screen in step S17, at least the processing of steps S20 to S29 can be skipped.

(Steps S30, S31) Then, the changeable function activation confirmation unit 651, implemented by the changeable function 65 of the installed firmware, checks or confirms to the activation management unit 614, that the changeable function is not activated at this stage, such as not only the function version of "V1.1" but also the changeable function having the function version older than the function version of "V1.1."

(Step S32) In this example case, it is assumed that the changeable function activation confirmation unit 651 has confirmed that all of the changeable functions of the firmware having the function version of "V1.1" are not yet activated (invalid) as a result of confirmation to the activation management unit 614.

(Step S33) If the changeable function activation confirmation unit 651 has confirmed that the changeable function corresponding to the function version of "V1.1" are not yet activated, the changeable function activation processing unit 652 transmits a display instruction of the changeable function dialog box (second screen), such as the changeable function dialog box 1510, corresponding to the changeable function that is not yet activated, to the UI unit 531. Then, the UI unit 531 instructs the display unit 112 to display the changeable function dialog box in accordance with the display instruction.

(Steps S34, S35) If the user presses the installation button on the changeable function dialog box via the input unit 111, the installation request unit 524 of the MFP 10 transmits, to the changeable function activation confirmation unit 651, an activation instruction for requesting an activation of the changeable function of the designated firmware. Thus, when the user presses the installation button on the changeable function dialog box, it becomes clear that the user wants to use the changeable function of the firmware having the function version confirmed by the user.

Further, the activation of the changeable function displayed on the changeable function dialog box by pressing the installation button is not always required. For example, if the user does not need the activation of changeable function, the changeable function dialog box can be closed by performing a given operation by the user, or the user can select not to activate the changeable function by operating a cancel button or the like. In this case, the processing of steps S35 to S37 is skipped.

(Steps S36, S37) In response receiving the activation instruction, the changeable function activation confirmation unit 651 confirms that the activation (enablement) of the changeable function having the function version of "V1.1" displayed on the changeable function dialog box is instructed. Then, the changeable function activation processing unit 652 activates (enables) the changeable function to be implemented by the changeable function 65.

Further, if the entire function enabling setting is turned "ON" on the entire function enabling setting screen 1620 and an existence of changeable function not yet activated is confirmed in step S32, the processing of steps S33 to S36 can be skipped, and then the changeable function activation processing unit 652 activates all of the confirmed changeable functions in step S37.

The processing of steps S33 to S37 is repeated for the number of the changeable functions that are confirmed not yet activated in step S32 (not only the function version of "V1.1" but also the changeable function having the function version older than the function version of "V1.1").

The firmware installation operation and firmware activation operation can be performed using the above described sequence of steps S11 to S37.

As to the above described information processing system 1, the information processing system 1 displays, to a user, screens displaying the function of the firmware to be updated for the electronic apparatus (e.g., MFP 10) used by the user, such as the notification dialog box 1500, the installation screen 1300, and the changeable function dialog box 1510, so that the user can recognize each function, such as addable function and changeable function. Then, each function can be activated by receiving an installation (including activation) instruction from the user on the screen. Thus, the function of the firmware to be updated can be validated according to a user consent, so that a situation in which the function is changed irrespective to the user intention can be prevented.

Further, as to the above described information processing system 1, the automatic update setting, the automatic activation setting, and the entire function enabling setting can be set. Therefore, depending on a usage style desired by the user, the firmware can be automatically updated, the addable function can be automatically activated when the firmware is updated, and all of the changeable functions can be automatically activated when the addable function is activated. As a result, user convenience can be improved.

Further, as to the above described information processing system 1, the period of time displaying the firmware, which is not yet updated or activated, on the widget 1003 or the notification dialog box 1500 can be set to a fixed period, such as one week. With this configuration, the user annoyance can be reduced.

As to the above described embodiment of the electronic apparatus, information processing system, and information processing method, the function of the firmware to be updated can be validated according to a user consent.

Each of the functions of the above-described embodiments can be implemented by one or more processing circuits or circuitry. The processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

In the above-described embodiment, when at least any functional units of the MFP 10, the application market server 20, the contract management server 30 and the PC 40 are implemented by executing one or more programs, the programs are provided in advance by storing the programs in the ROM or the like.

Further, the programs executed by the MFP 10, the application market server 20, the contract management server 30 and the PC 40 according to the above-described embodiment may be configured to be recorded on a computer-readable recoding medium, such as compact disk read only memory (CD-ROM), flexible disk (FD), compact disk-recordable (CD-R), digital versatile disc (DVD) or secure digital (SD) card, as files in an installable format or executable format.

Further, the programs executed by the MFP 10, the application market server 20, the contract management server 30 and the PC 40 according to the above-described embodiment may be configured to be stored in one or more computers connected to a network, such as the Internet, and downloaded via the network.

Further, the programs executed by the MFP 10, the application market server 20, the contract management server 30 and the PC 40 according to the above-described embodiment may be configured to be provided or distributed over a network, such as the Internet.

Further, the programs executed by the MFP 10, the application market server 20, the contract management server 30 and the PC 40 according to the above-described embodiment can be implemented as one or more modules including at least any of the functional units described above, and as the actual hardware configuration, the CPU reads and executes the programs from the above-described storage device or apparatus to load and implement the above-described functional units on the main storage device.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each function of the embodiments described above may be implemented by one or more processing circuits. Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An electronic apparatus, comprising:
   circuitry configured to:
   download software which includes one or more first functions and one or more second functions, the one or more first functions being automatically updated and enabled, the one or more second functions being automatically updated and enabled according to a user operation, the updated first functions and the updated second functions being executable only after being enabled;
   update and enable, automatically, the one or more first functions included in the downloaded software;
   update, automatically, the one or more second functions included in the downloaded software, without enabling the one or more second functions included in the downloaded software;
   receive another user operation indicating the one or more second functions are to be enabled, after enabling the one or more first functions and after updating the one or more second functions prior to the one or more second functions being enabled; and
   enable the updated one or more second functions, based on receiving the another user operation.

2. The electronic apparatus of claim 1, wherein:
   the circuitry is further configured to perform at least one of first processing or second processing to enable the one or more first functions or the one or more second functions, the first processing being updating the one or more first functions or the one or more second functions, the second processing being activating the one or more first functions or the one or more second functions included in the software.

3. The electronic apparatus of claim 1, wherein the circuitry is further configured to:
   display a list screen including information on a plurality of software programs including the downloaded software;
   receive selection of one of the plurality of software programs on the list screen; and
   enable the one or more second functions included in the software program selected on the list screen.

4. The electronic apparatus of claim 1, wherein the circuitry is further configured to:
   display a selection screen including the one or more second functions;
   receive a selection of one of the one or more second functions on the selection screen; and
   enable the one of the one or more second functions.

5. The electronic apparatus of claim 1, wherein the circuitry is further configured to:
   automatically enable the one or more first functions from among entire functions included in the software in response to the software being downloaded to the electronic apparatus.

6. A method, performed by one or more processors, comprising:
   downloading software which includes one or more first functions and one or more second functions, the one or more first functions being automatically updated and enabled, the one or more second functions being automatically updated and enabled according to a user operation, the updated first functions and the updated second functions being executable only after being enabled;
   updating and enabling, automatically, the one or more first functions included in the downloaded software;
   updating, automatically, the one or more second functions included in the downloaded software, without enabling the one or more second functions included in the downloaded software;
   receiving another user operation indicating the one or more second functions are to be enabled, after enabling the one or more first functions and after updating the one or more second functions prior to the one or more second functions being enabled; and
   enabling the updated one or more second functions, based on receiving the another user operation.

7. The method of claim 6, further comprising:
   performing at least one of first processing or second processing to enable the one or more first functions or the one or more second functions, the first processing being updating the one or more first functions or the one or more second functions, the second processing being activating the one or more first functions or the one or more second functions included in the software.

8. The method of claim 6, further comprising:
   displaying a list screen including information on a plurality of software programs including the downloaded software;
   receiving selection of one of the plurality of software programs on the list screen; and
   enabling the one or more second functions included in the software program selected on the list screen.

9. The method of claim 6, further comprising:
   displaying a selection screen including the one or more second functions;
   receiving a selection of one of the one or more second functions on the selection screen; and
   enabling the one of the one or more second functions.

10. The method of claim 6, further comprising:
    automatically enabling the one or more first functions from among entire functions included in the software in response to the software being downloaded.

11. A system, comprising:
    a server; and
    an electronic apparatus, including:
    circuitry configured to:
    download software which includes one or more first functions and one or more second functions, the one or more first functions being automatically updated and enabled, the one or more second functions being automatically updated and enabled according to a user operation, the updated first functions and the updated second functions being executable only after being enabled;
    update and enable, automatically, the one or more first functions included in the downloaded software;
    update, automatically, the one or more second functions included in the downloaded software, without enabling the one or more second functions included in the downloaded software;
    receive another user operation indicating the one or more second functions are to be enabled, after enabling the one or more first functions and after updating the one or more second functions prior to the one or more second functions being enabled; and
    enable the updated one or more second functions, based on receiving the another user operation.

12. The system of claim 11, wherein:
the circuitry is further configured to perform at least one of first processing or second processing to enable the one or more first functions or the one or more second functions, the first processing being updating the one or more first functions or the one or more second functions, the second processing being activating the one or more first functions or the one or more second functions included in the software.

13. The system of claim 11, wherein the circuitry is further configured to:
display a list screen including information on a plurality of software programs including the downloaded software;
receive selection of one of the plurality of software programs on the list screen; and
enable the one or more second functions included in the software program selected on the list screen.

14. The system of claim 11, wherein the circuitry is further configured to:
display a selection screen including the one or more second functions;
receive a selection of one of the one or more second functions on the selection screen; and
enable the one of the one or more second functions.

15. The system of claim 11, wherein the circuitry is further configured to:
automatically enable the one or more first functions from among entire functions included in the software in response to the software being downloaded to the electronic apparatus.

* * * * *